(12) United States Patent
Pana et al.

(10) Patent No.: US 9,501,263 B2
(45) Date of Patent: Nov. 22, 2016

(54) AUTOMATED MODEL DERIVATION AND ALIGNMENT

(71) Applicant: ORACLE INTERNATIONAL CORPORATION, Rewood Shores (CA)

(72) Inventors: Mircea Pana, Ottawa (CA); Curtis Desrosiers, Markham (CA); Bryan Obright, Milton (CA); Nihal J. Mehta, Plano, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 32 days.

(21) Appl. No.: 14/575,290

(22) Filed: Dec. 18, 2014

(65) Prior Publication Data
US 2016/0179474 A1     Jun. 23, 2016

(51) Int. Cl.
*G06F 9/44*     (2006.01)
*G06Q 10/06*    (2012.01)

(52) U.S. Cl.
CPC . *G06F 8/20* (2013.01); *G06F 8/35* (2013.01); *G06Q 10/067* (2013.01)

(58) Field of Classification Search
CPC .......... G06F 8/20; G06F 8/35; G06Q 10/067
USPC ...................................................... 717/104
See application file for complete search history.

(56) References Cited

U.S. PATENT DOCUMENTS

| | | | | |
|---|---|---|---|---|
| 7,334,216 B2* | 2/2008 | Molina-Moreno | ....... | G06F 8/35 717/105 |
| 7,571,082 B2* | 8/2009 | Gilpin | ................. | G06Q 10/063 703/14 |
| 7,693,586 B2* | 4/2010 | Dumas | ...................... | G06F 8/20 700/32 |
| 7,694,284 B2* | 4/2010 | Berg | ........................ | G06F 8/36 717/137 |
| 7,703,071 B2* | 4/2010 | Kuester | ..................... | G06F 8/10 717/101 |
| 7,873,422 B2* | 1/2011 | Dumas | ...................... | G06F 8/10 700/29 |
| 7,890,924 B2* | 2/2011 | Raffo | .................. | G06F 17/5009 717/100 |
| 7,941,438 B2* | 5/2011 | Molina-Moreno | ....... | G06F 8/35 707/756 |
| 8,006,223 B2* | 8/2011 | Boulineau | ................. | G06F 8/20 705/7.22 |
| 8,285,676 B2* | 10/2012 | Bahl | ........................ | G06F 8/34 707/626 |
| 8,302,071 B2* | 10/2012 | Gschwind | ............. | G06Q 10/06 717/105 |
| 8,370,462 B2 | 2/2013 | Pelletier et al. | | |
| 8,595,119 B2* | 11/2013 | Milne | ...................... | G06F 8/10 705/35 |

(Continued)

OTHER PUBLICATIONS

Beyond ERP systems: An outline of self-referential enterprise systems. Requirements, conceptual foundation and design options—Frank, Ulrich; Strecker, Stefan—Provided in Cooperation with:University Duisburg-Essen, Institute for Computer Science and Business Information Systems (ICB)-2009.*

(Continued)

*Primary Examiner* — Francisco Aponte
(74) *Attorney, Agent, or Firm* — Miles & Stockbridge P.C.

(57) ABSTRACT

A model manager is provided that manages model derivation and alignment. A realization relationship is created between a source model element and a derived model element. The derived model element is validated to conform to an intent of the source model element. When the derived model element does not confirm to the intent of the source model element, the derived model element and the source model element are synchronized. The synchronizing includes re-aligning one or more portions of at least one of the derived model element and the source model element that no longer conform to the other model element.

19 Claims, 19 Drawing Sheets

(56) References Cited

U.S. PATENT DOCUMENTS

| | | | | |
|---|---|---|---|---|
| 8,601,449 | B2* | 12/2013 | Clevenger | G06F 8/40 717/104 |
| 9,021,417 | B2* | 4/2015 | Clarke | G06F 8/10 717/104 |
| 9,286,037 | B2* | 3/2016 | Winkler | G06F 8/34 |
| 9,342,220 | B2* | 5/2016 | Basu | G06F 3/0484 |
| 2003/0225607 | A1* | 12/2003 | Kopunovic | G06Q 10/10 705/7.13 |
| 2006/0200800 | A1* | 9/2006 | Melby | G06F 8/24 717/114 |
| 2006/0206865 | A1* | 9/2006 | Reinhardt | G06F 17/30908 717/108 |
| 2006/0253840 | A1* | 11/2006 | Cruickshank | G06F 11/3447 717/127 |
| 2009/0019426 | A1* | 1/2009 | Baeumer | G06F 8/72 717/122 |
| 2009/0100405 | A1* | 4/2009 | Belenky | G06F 8/10 717/104 |
| 2009/0113382 | A1* | 4/2009 | Chancey | G06F 8/10 717/104 |
| 2011/0161912 | A1* | 6/2011 | Eteminan | G06F 8/20 717/101 |
| 2011/0296419 | A1* | 12/2011 | Dumas | G06F 8/10 718/101 |
| 2012/0042299 | A1* | 2/2012 | Perrin | G06F 8/10 717/104 |
| 2012/0166246 | A1* | 6/2012 | Simon | G06Q 10/06316 705/7.26 |
| 2014/0089113 | A1* | 3/2014 | Desai | G06Q 20/322 705/16 |
| 2014/0237443 | A1 | 8/2014 | Pana et al. | |
| 2016/0021198 | A1* | 1/2016 | Liu | H04L 43/0876 709/223 |

OTHER PUBLICATIONS

Simplifying the Development of Cross-Platform Web User Interfaces by Collaborative Model-based Design—Vivian Genaro Motti, Sascha Van Cauwelaert, Jean Vanderdonckt, Université catholique de Louvain, Louvain School of Management, Place des Doyens, Belgium-Dave Raggett—World Wide Web Consortium; SIGDOC'13, Sep. 30-Oct. 1, 2013, NC.*

From conceptual process models to running systems: A holistic approach for the configuration of enterprise system processes—Alexander Dreiling, Michael Rosemann, Wil M.P. van der Aalst, Wasim Sadiq—SAP Research and Queensland University of Technology, Brisbane, Australia—A. Dreiling et al. / Decision Support Systems 45 (2008).*

* cited by examiner

400

420

440

AUTOMATED MODEL DERIVATION AND ALIGNMENT

FIELD

One embodiment is directed generally to a computer system, and in particular to a computer system that manages model derivation and alignment.

BACKGROUND INFORMATION

In response to the ever-increasing demand for rapid solution design, telecommunications software vendors have introduced highly customizable products. Thus, many of the contemporary products are model driven and include post-market design capabilities. As a result, customers can develop their solutions using the flexible but complex design environments and techniques offered by software vendors.

High solution development cost is one of the consequences of the complexity of today's software design environments. A solution can often involve the use of multiple design paradigms and techniques, each leading to a specific implementation, and complex interdependencies and significant model overlap can occur across solutions. This approach is highly laborious, error prone and expensive.

SUMMARY

One embodiment is a system that manages model derivation and alignment. The system creates a realization relationship between a source model element and a derived model element. The system validates that the derived model element conforms to an intent of the source model element. When the derived model element does not confirm to the intent of the source model element, the system synchronizes the derived model element and the source model element. The system re-aligns one or more portions of at least one of the derived model element and the source model element that no longer conform to the other model element.

DETAILED DESCRIPTION

One embodiment is a system that manages application configuration models for configuring application solutions (i.e., run-time environments such as, for example, order management, inventory management, and/or activation management systems) to implement commercial products being offered for sale to customers. The products can include, for example, a broadband product providing internet access to customers via a digital subscriber line ("DSL"). The system can be used to create a conceptual model that defines relationships between the broadband product and corresponding services, and resources that implement the services of the broadband product. For example, the conceptual model can define the broadband product and the actions that should be performed to provision a service order request for the broadband product. The conceptual model can include entities that represent components of a corresponding service but the conceptual model may include no detailed application-specific (or solution-specific) information.

The system can, based on configurable/extensible design patterns, automatically convert (or "realize") the conceptual model into an application model that includes application entities corresponding to the selected run-time environments. The application entities can be deployed to their corresponding run-time environments to implement the broadband product. When changes are made, the system can validate the models and generate a notification if the application model is no longer aligned (i.e., consistent with) the conceptual model. The system can also align (or synchronize) the conceptual model and the application entities automatically and/or manually. The system can automatically update the application model based on a change to the conceptual model, and any updated application entities can be deployed to the corresponding run-time environments to implement the broadband product in accordance with the updated conceptual model.

Figure 1:
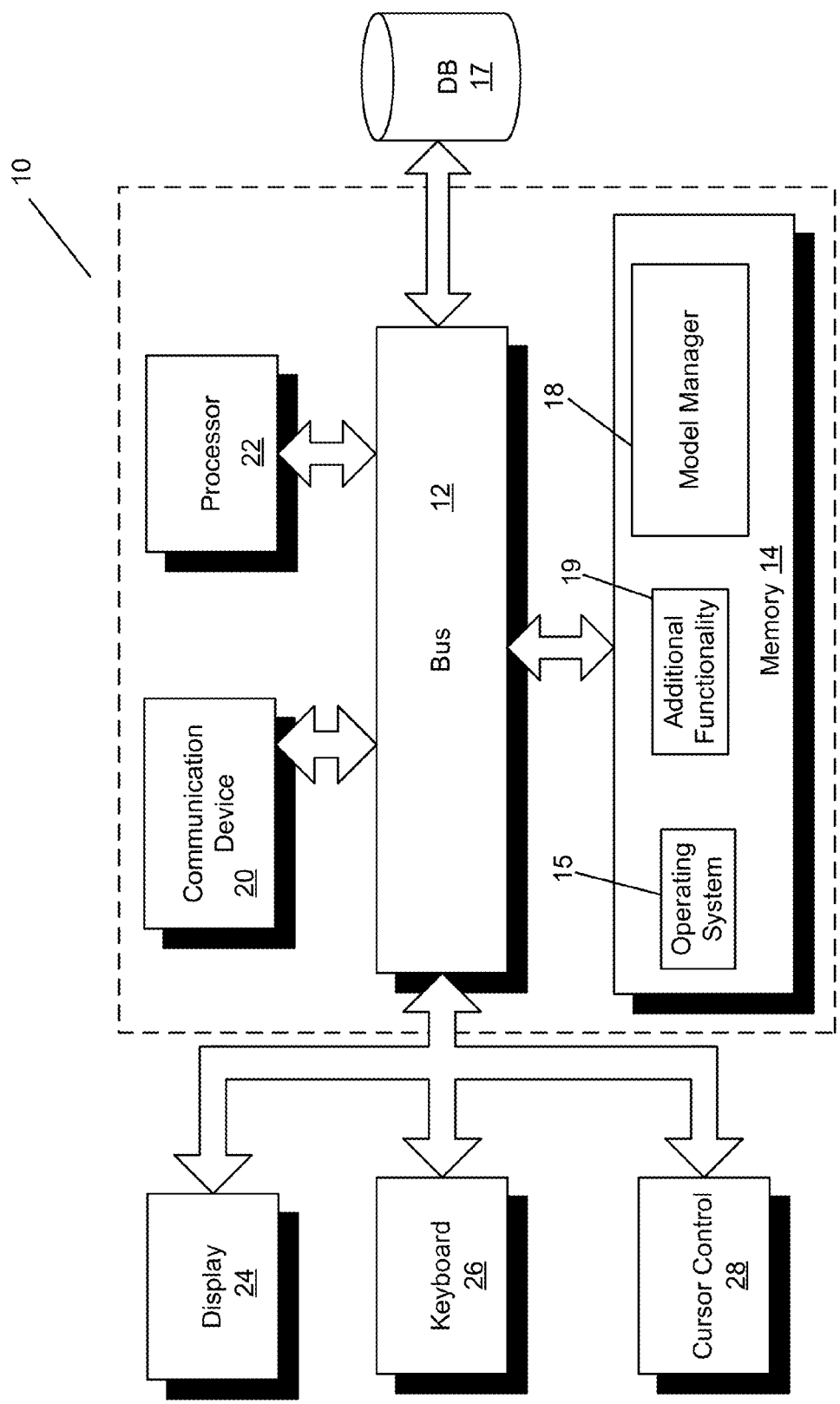
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a model manager 18 that manages model derivation and alignment, as disclosed in more detail below. System 10 can be part of a larger system. Therefore, system 10 can include one or more additional functional modules 19 to include the additional functionality. For example, functional modules 19 may include modules that provide additional functionality, such as an integrated development environment ("IDE") (e.g., the Oracle Communications Design Studio from Oracle Corp.).

A database 17 is coupled to bus 12 to provide centralized storage for modules 18 and 19 and store model information, model management information, etc. Database 17 can store data in an integrated collection of logically-related records or files. Database 17 can be an operational database, an analytical database, a data warehouse, a distributed database, an end-user database, an external database, a navigational database, an in-memory database, a document-oriented database, a real-time database, a relational database, an object-oriented database, or any other database known in the art. Additionally or alternatively, a file system can provide storage for modules 18 and 19 and store model information, model management information, etc. In some embodiments, database 17 can provide a source control repository for some or all files stored by the file system.

In one embodiment, system 10 assists a user in modeling application configurations and manages model derivation and alignment by providing a graphical user interface ("GUI") that allows the user to edit application configuration models that are managed by a model manager (e.g., model manager 18). The models can be for configuring application solutions (i.e., run-time environments) selected to implement commercial products being offered for sale to customers. The GUI can allow a user to create/modify a conceptual model (or "source model" or "common concept") that defines relationships between the commercial products and their corresponding services, and resources that implement the services of the commercial products. System 10 can, based on configurable/extensible design patterns, automatically convert (or "realize") the conceptual model into an application model (or "derived model" or "synchronized component model") that includes application entities (or "derived model elements" or "synchronized component concepts") corresponding the selected application solution run-time environments. System 10 can deploy the application entities to their corresponding run-time environments to implement the commercial products.

In some embodiments, system 10 can, when changes are made, validate the models and generate a notification if the conceptual and application models are no longer aligned (i.e., consistent with each other). In some embodiments, system 10 can, automatically and/or upon user input, align the conceptual model and the application model when the conceptual model is modified to realize updated application entities. In such embodiments, system 10 can automatically and/or upon user input deploy the updated application entities to the corresponding the selected application solution run-time environments to implement the commercial products according to the updated conceptual model. In some embodiments, system 10 can automatically and/or upon user input align the conceptual model and the application model when an application entity is modified by modifying the conceptual model to incorporate the change made to the application entity.

Performing automated model derivation and alignment, as disclosed herein, changes the team dynamics in complex multi-application solution development operations, and eliminates a number of design inefficiencies. In some embodiments, automated model derivation and alignment is based on two observations: first, that the same concepts are typically (re-)designed into multiple solution components that may or may not be explicitly modeled as solution level design artifacts; and second, that, given a particular embodiment of the common concepts (or conceptual model) and with knowledge of the specific modeling techniques for the other solution components, system 10 can predict a pattern (e.g., suggest/provide a default pattern) for the design of the other artifacts related to the same concepts. In some embodiments, system 10 enables the definition and execution of such patterns of design in an automated fashion.

In one embodiment, model derivation rules are defined as patterns and system 10 uses the designated conceptual model as input to automatically derive multiple solution design artifacts (or application entities). Existing solution design artifacts are automatically realigned with the model using the same patterns configured to override and correct discrepancies. System 10 can also be configured to detect changes in the designated model and to automatically propagate the relevant changes to the derived models and design artifacts.

As a result, in some embodiments, automated model derivation and alignment creates strong ties between solution components traditionally developed by different people or teams. By having one model (e.g., the conceptual model) effectively generate portions of the design for the other components, redundancy in solution design activities are reduced or eliminated and the risks of model misalignments are reduced.

In some embodiments, system 10 automatically translates and shares (e.g., deploys) the definitions of concepts between various application solution systems. In such embodiments, system 10 performs the alignment automatically, enforces consistency between models, and/or detects and prevents deviation. Additionally, in some embodiments, since all application solution systems are working with a consistent representation of the underlying concepts, a common architecture is not required when processing (although it is not precluded) (i.e., a common architecture is not required to be manually implemented/maintained across all application solution systems). Instead of a first (i.e., source) application adapting its internal concepts into a common format, which is then routed to a second (i.e., target) system where it is again adapted from the common representation into the second system, system 10 can be used to automatically synchronize/deploy model components across application solution systems such that system 10 can automatically perform only one adaptation (e.g., the realization of the conceptual model) to deal with various system architectures (i.e., language transformations between the source and target system).

Automated model derivation and alignment, as disclosed herein, brings improvements in several areas of the solution development lifecycle. For example, by generating related design artifacts from a central model as opposed to hand-coding them, redundant design activities are eliminated. Further, the traditional reliance on a solution architecture/functional specification document is reduced if not eliminated (i.e., design teams no longer need to rely on documentation as the sole means to communicate the functional details for the common concepts since these are automatically propagated across the solution). Further, embodiments also include improvements in the communication between design teams and in the ability to perform an impact analysis for model changes. In addition, the modeling activities are programmatically linked across solution components, providing a solution free of model drifts or related design discrepancies. As a result, the occurrence of this class of "bugs" is reduced if not eliminated. Therefore, the quality assurance and maintenance costs will see an improvement.

Also, automated model derivation and alignment, as disclosed herein, is both non-intrusive into (i.e., decoupled from) the modeling and design capabilities of the components and also permits the post-market development of the derivation rules. As a result, the automated model derivation rules can be decoupled from the release cycles of the individual components. Also, the ability to develop post-market derivation rules (e.g., design patterns) enables both the broadening of applicability across solution domains and integration with third-party or custom solution components.

Figure 2A:
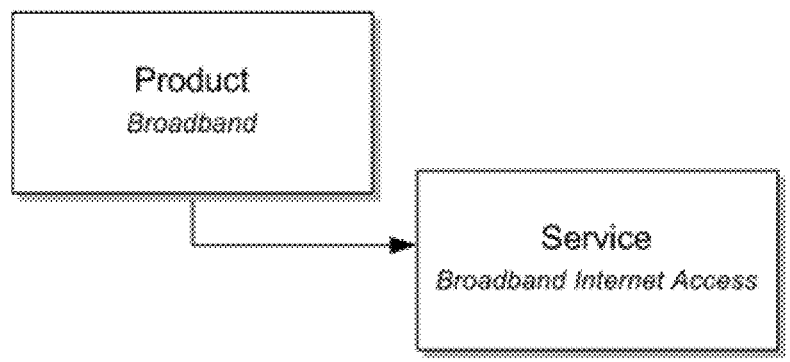
FIG. 2A is a block diagram illustrating a conceptual model that illustrates how a product "Broadband" that is sold to a customer is fulfilled by a service "Broadband Internet Access," in accordance with an embodiment of the invention.

FIG. 2A is a block diagram 200 illustrating a conceptual model that illustrates how a product "Broadband" that is sold to a customer is fulfilled by a service "Broadband Internet Access," in accordance with an embodiment of the invention. In some embodiments, conceptual models can define the relationships between commercial products, the services that they represent, and the resources that are required/desired to implement the services. Conceptual models can define how commercial products and technical services are related, and can enable the association of the products being sold with the technical services and resources that are required/desired to fulfill orders. Conceptual models can comprise entities that represent components of a service but that contain, in some embodiments, no detailed application-specific information. The definition of conceptual model entities determines how service capabilities can be commercialized. For example, the conceptual model defines products and services and the actions that must be performed in a run-time environment to provision a service order request.

When designing conceptual models, a user can define the associations among the conceptual model entities. The user can also define the patterns (or "design patterns") that are used to fulfill service orders and technical orders. These patterns define how requests to design reusable service components are fulfilled and how delivery systems activate and manage the work to be performed on resources in the network. Conceptual model 200 is an example that illustrates how a product (called "Broadband") that is sold to a customer is fulfilled by a service (called "Broadband Internet Access").

Figure 2B:
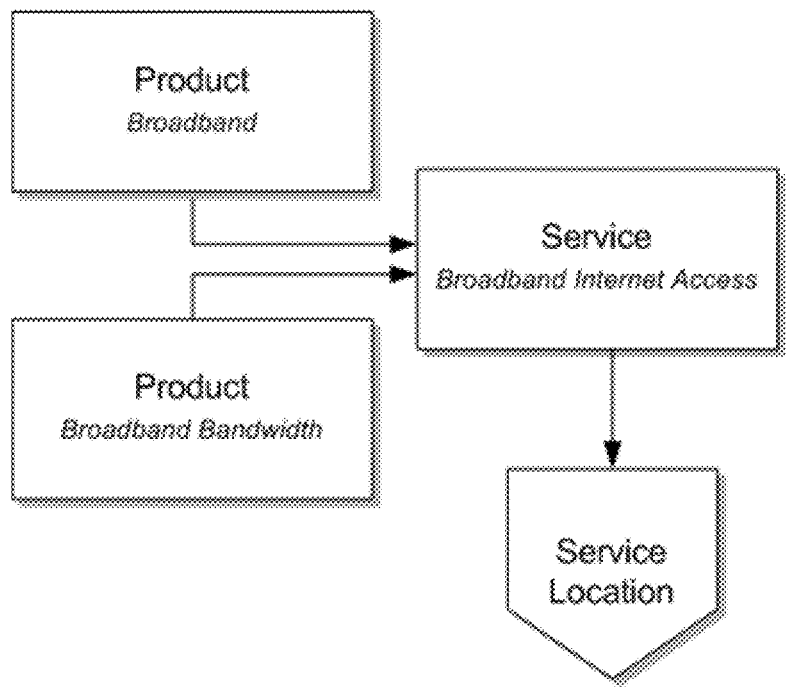
FIG. 2B is a block diagram illustrating a conceptual model that illustrates how two products, "Broadband" and "Broadband Bandwidth," that are sold to a customer are fulfilled by the same service, "Broadband Internet Access," in accordance with an embodiment of the invention.

FIG. 2B is a block diagram 210 illustrating a conceptual model that illustrates how two products, "Broadband" and "Broadband Bandwidth," that are sold to a customer are fulfilled by the same service, "Broadband Internet Access," in accordance with an embodiment of the invention. Diagram 210 illustrates how you can associate multiple products to the same service. The "Broadband" and "Broadband Bandwidth" products are both associated with a single customer facing service, the "Broadband Internet Access" service. Also, the service can be associated to a specific location (or "service location").

Figure 2C:
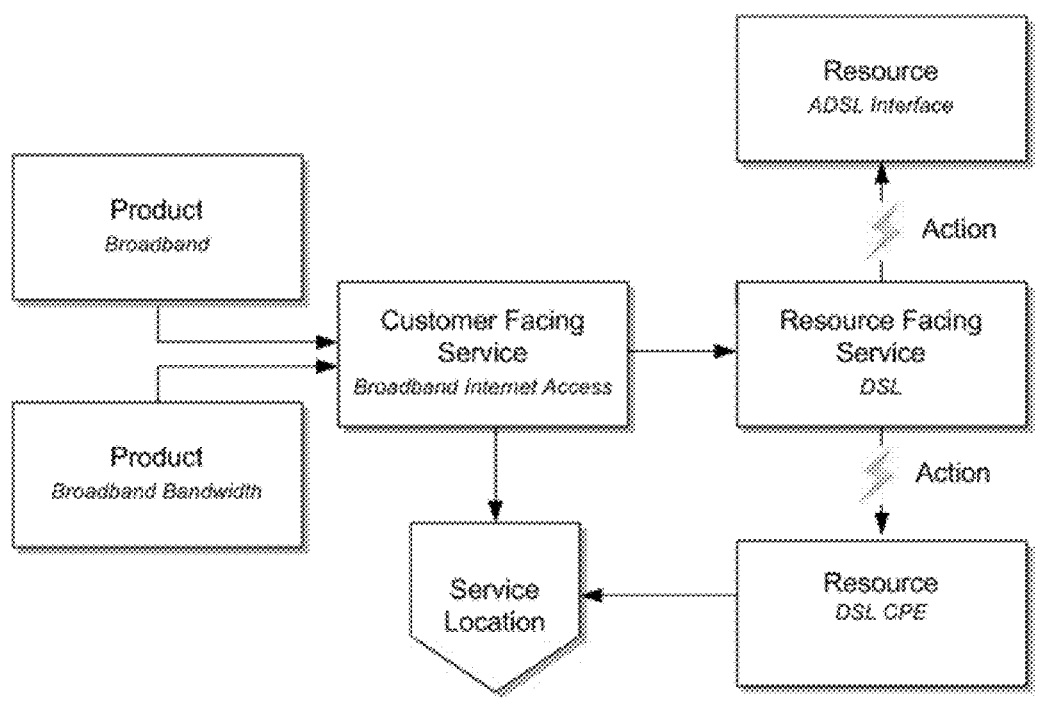
FIG. 2C is a block diagram illustrating a conceptual model that illustrates technical components used to provision the "Broadband Internet Access" service, in accordance with an embodiment of the invention.

FIG. 2C is a block diagram 220 illustrating a conceptual model that illustrates technical components used to provision the "Broadband Internet Access" service, in accordance with an embodiment of the invention. Conceptual models can include definitions of the actions that are required to provision a service. For example, a user can define the actions necessary to add a DSL service for a new customer or disconnect an existing DSL service for an existing customer. Diagram 220 shows a small subset of the technical components required to provision the "Broadband Internet Access" service; for example, a resource facing service (DSL) and two resources (customer premise equipment and a DSL interface, named "DSL CPE" and "ADSL Interface," respectively).

Figure 2D:
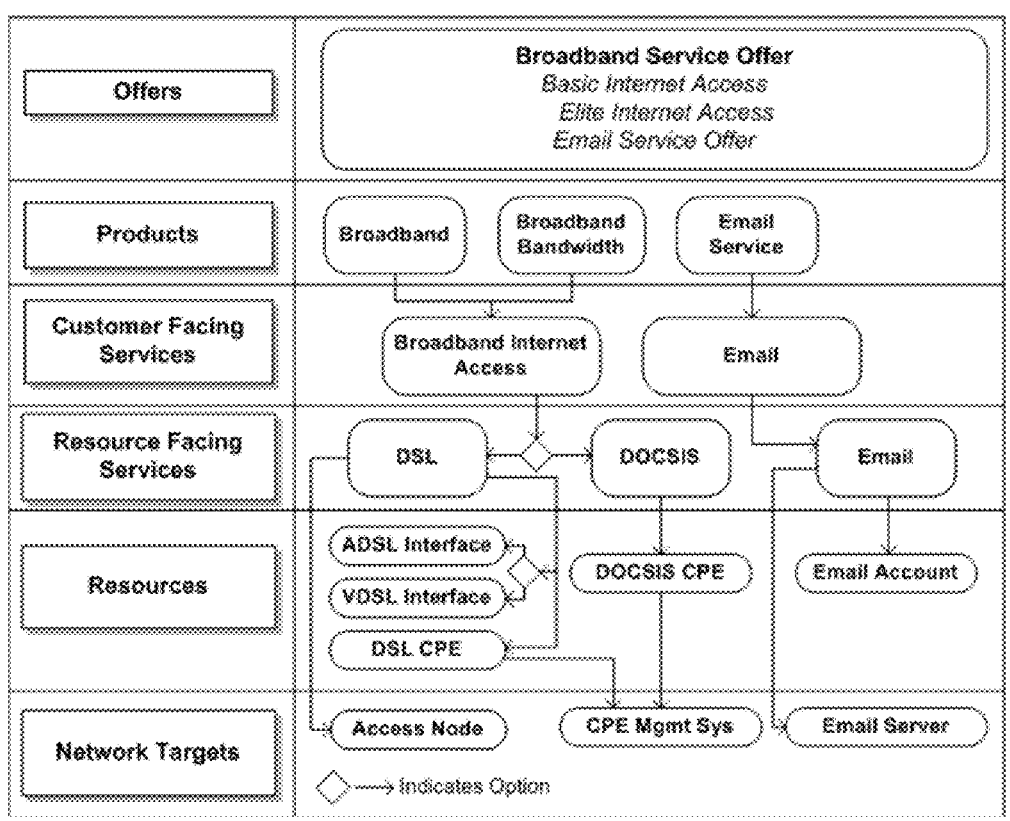
FIG. 2D is a block diagram illustrating a conceptual model for a broadband domain, in accordance with an embodiment of the invention.

FIG. 2D is a block diagram 230 illustrating a conceptual model for a broadband domain, in accordance with an embodiment of the invention. A user can define conceptual models in model projects, which are not directly deployed to run-time environments. The conceptual model entities are converted (or "realized") into application entities which can be saved in application cartridge projects. This conversion is called "realization." Users can enrich the application-specific entities with additional configuration and deploy the application cartridge projects to run-time environments. In some embodiments, conceptual models can be realized into application entities targeted for application solutions (e.g., run-time environments) provided by different vendors.

In some embodiments, a conceptual model includes one or more of the following entities: customer facing services, which represent services from a customer perspective; resource facing services, which represent a technical view of a service; resources, which represent the entities that are required to configure the service; products, which represent commercial products; locations, which represent physical locations (e.g., in a broadband service, the DSL RFS for a DSL service can be associated with a location to represent the geographic address of the customer); actions, which describe how conceptual model entities change, cause change, or retrieve information (actions are associated with customer facing services, resource facing services, and resources); action codes, which represent the specific types of actions permitted for each type of action (e.g., a service action named "SA_Provision_BroadbandInternet" includes a number of action codes, including "Create," "Disconnect," and "Remove"); domains, which are groups of entities and actions that you can use to organize and filter solutions. functional areas, which are the logical layers of an installation and can be commercial, service, and technical layers (the targeted application solutions can include, for example, Oracle Communications Order and Service Management ("OSM"), and these layers can be supported by an OSM order type or by an external order management system); provider functions, which are processing components that perform a defined set of tasks based on their role in a solution (the configuration for some provider functions is included in some embodiments, such as Calculate Service Order, Design and Assign, Calculate Technical Order, and Activation); and fulfillment patterns, which describe the high-level functions that are required/desired (and in what order) to process an action or a conceptual model entity.

The conceptual model entities and the relationships among them form a model of a service domain. These associations are called "named relationships," and named relationships are added to entities by defining components.

A component is a container that represents all of the viable configurations that can be defined for the relationship. For example, the "Broadband Internet Access" customer facing service ("CFS") can include the "Access" component. The "Access" component can represent all of the resource facing services that can be used to deliver the "Broadband Internet Access" service.

When a user begins modeling, they may not have information about a component except for the name and specification type. For example, early in conceptual model design, the user may not yet have specific details about the "Access" component except to know that the "Broadband Internet Access" CFS requires specific technologies to support the service. The "Access" component name describes the role of the relationship (Access) and the type describes the specification type (a resource facing service). To complete the model, the user can define the component options. For example, the "Access" component may include DSL, Fiber, and Data Over Cable Service Interface Specification ("DOCSIS") options. Diagram 230 illustrates how these options are instances of resource facing services, and they represent viable resource facing services that can support access for the "Broadband Internet Access" CFS. The type of access that is provisioned may depend on the geographic location, where one location requires the use of DSL, another requires the use of DOCSIS, and a third requires Fiber.

In embodiments, realization is the conversion of a conceptual model entity into an application entity. Conceptual model entities are not directly deployed to run-time environments. Rather, conceptual model entities are converted into application model entities. This conversion process is called realization. The conversion starts with a conceptual model entity and creates a real application model entity.

In embodiments, users can define how conceptual model entities are realized into application projects by identifying which application entity is realized by the conceptual model entity, and by identifying a design pattern that generates the realization in the application project. In some embodiments, conceptual model entities can be realized into an application project for one or more of each of the following: Oracle Inventory, Oracle Communications ASAP, Oracle Communications Network Integrity, Oracle Communications Order and Service Management ("OSM"), or any configurable system/component/application (e.g., any system supporting file-based configuration). In such embodiments, conceptual model entities can be realized as follows:

Customer facing services and resource facing services are represented in for Inventory projects as "Service" specifications and as "Service Configuration" specifications and a data element defined on a CFS and/or RFS is realized if the data element is defined with the "Changeable" tag;

Resources are realized for Inventory projects as the Inventory entity appropriate to the resource that is specified (resources can be realized as "Logical Device" specifications, "Logical Device Account" specifications, "Telephone Number" specifications, etc.);

Resources can also be realized using an "Other" option if it is desired to realize a resource as an inventory resource that is not available as a realization option (when selecting this option, a user can define their own design pattern);

Service actions are realized for Inventory projects as rule sets (however, rule sets may not be auto-generated by a design pattern and a user may manually create the rule sets in an Inventory project);

Technical actions are realized for ASAP projects as service actions (e.g., Common Service Description Layer ("CSDL") commands), or for Network Integrity projects as scan actions.

Locations are realized for Inventory projects as "Geographic Place" specifications.

Fulfillment patterns are realized for OSM projects as fulfillment patterns.

In embodiments, design patterns are wizards that automate complex, repeatable tasks, and enable team members with varying levels of skill to complete those tasks, such as, for example, the wizard GUI shown in FIGS. 10-12 below. Design patterns enable users to define a generic pattern that, when executed, automates the creation of model objects and their relationships.

In some embodiments, default design patterns are provided that automate the conversion (or realization) of conceptual model entities into application entities such as, for example, those listed above. The design patterns can be run using the wizard GUI shown, for example, in FIGS. 10-12, or by right-clicking an entity, selecting "Synchronized Realization," and then selecting an option from the menu as shown, for example, in FIG. 9 below. Conceptual model entities can also be configured so that associated design patterns run automatically. In some embodiments, after a conceptual model entity's default design pattern is run once, the design pattern is re-run when changes are made to the conceptual model entity.

In some embodiments, conceptual model entities and the application model realizations (or entities) are synchronized so that any changes made by a user to the conceptual model entities will be automatically reflected on the application model entities. In some embodiments, conceptual model design patterns are associated by hierarchical relationships so that when a design pattern is run against an entity using the "Synchronize All" option, shown, for example, in FIG. 16, the pattern automatically runs all relevant child design patterns to realize the entire conceptual entity tree. Conceptual model entities can be synchronized with application model entities to ensure that the configuration of the application entities and the related conceptual model entities remain aligned.

In some embodiments, after conceptual model entities are realized into application-specific entities, a user can enrich the application entities with data required by the application. During this process, the user may change the entities in the application project. In such embodiments, when a user synchronizes conceptual model and application projects, data elements defined by the user on the application entities are not modified or deleted. In some embodiments, during synchronization, only the data elements and configuration items inherited from the conceptual model entities are recreated in the application entities.

In some embodiments, conceptual model entities are synchronized with application model entities by re-running the realization design patterns. The design patterns can be configured to run automatically (e.g., when an entity is saved), or the design patterns can be run manually by user selection of a pattern from a context menu. Also, a user can perform a bulk update by running a design pattern for an entity and selecting an option to run all required design patterns for all child entities in the hierarchy.

In some embodiments, before a conceptual model entity can be synchronized with an application entity, the conceptual model entity must be realized in an application project. A user can provide data in a Design Pattern wizard, such as, for example, the wizard shown in FIGS. 10-12, to generate the application-specific configuration. In some embodiments, to keep the entities synchronized, the design pattern can be re-run in the background using the data that you previously specified.

In some embodiments, a user can select to synchronize manually. For example, if a user desires to track all changes to conceptual model entities and application model entities, the user can disable automatic synchronization until they have finished their analysis and determined the impact of the changes to conceptual model entities. When finished, the user can select "Synchronize All," as shown, for example, in FIG. 16, from the context menu to perform a bulk update on a hierarchy of conceptual model entities.

In some embodiments, the following conceptual model entities can be synchronized with their associated application entities: Customer Facing Service; Resource Facing Service; Resource; and or Location.

In some embodiments, when design patterns are run, user-supplied values are saved in a synchronization record. In such embodiments, these values are used to re-run the design pattern automatically (if the conceptual model entity has been configured to run automatically) and/or to keep the conceptual model entities synchronized with the realized application entities. In some embodiments, if a valid synchronization record does not exist for a conceptual model specification, the "Synchronize" and "Synchronize All" context menu options are not available, as shown, for example, in FIG. 9, below. If a valid synchronization record exists for a conceptual model entity and the design pattern is re-run for that entity, the information in the synchronization record can be used to pre-populate the values in the Design Pattern wizard.

Although described with respect to telecommunications application modeling, the conceptual models described above can be any type/kind of conceptual model realized by any kind of solution-specific entity.

Figure 3A:
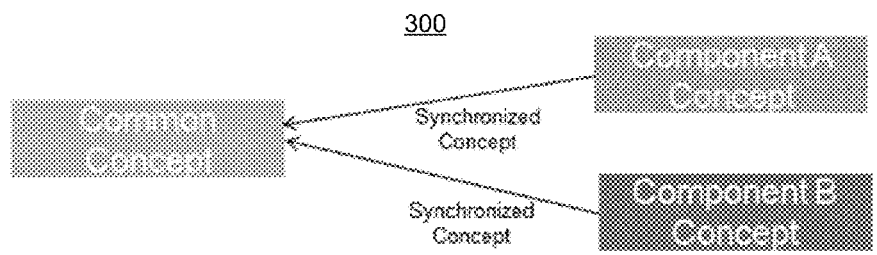
FIG. 3A is a block diagram illustrating a common concept linked to two component concepts as synchronized concepts, in accordance with an embodiment of the invention.

FIG. 3A is a block diagram 300 illustrating a common concept linked to two component concepts as synchronized concepts, in accordance with an embodiment of the invention. System 10 can model common concepts, as well as model component specific configurations for various system components. The common concept can be linked to one or more component concepts as a synchronized concept (i.e., the common concept can be realized by the one or more component concepts).

In some embodiments, system 10 comprises a framework such that once the common concept has been linked to (e.g., realized by) a component concept as a synchronized concept, certain functionality can be "plugged in" to the system, and such functionality can include, for example: component concepts can be verified to conform to the related common concepts; common concepts can be created from component concepts; component concept can be created that conforms to common concepts; detailed aspects of the common model can be used to update (synchronize) component models; detailed aspects of the component models can be used to update (synchronize) common concepts; and relationships between common concepts can be used to create, synchronize and/or enforce relationships between concepts within a component. The pluggable functionality provides functionality such that a solution model can be built either starting from the common model or component models, and/or through iterative changes to each.

Figure 3B:
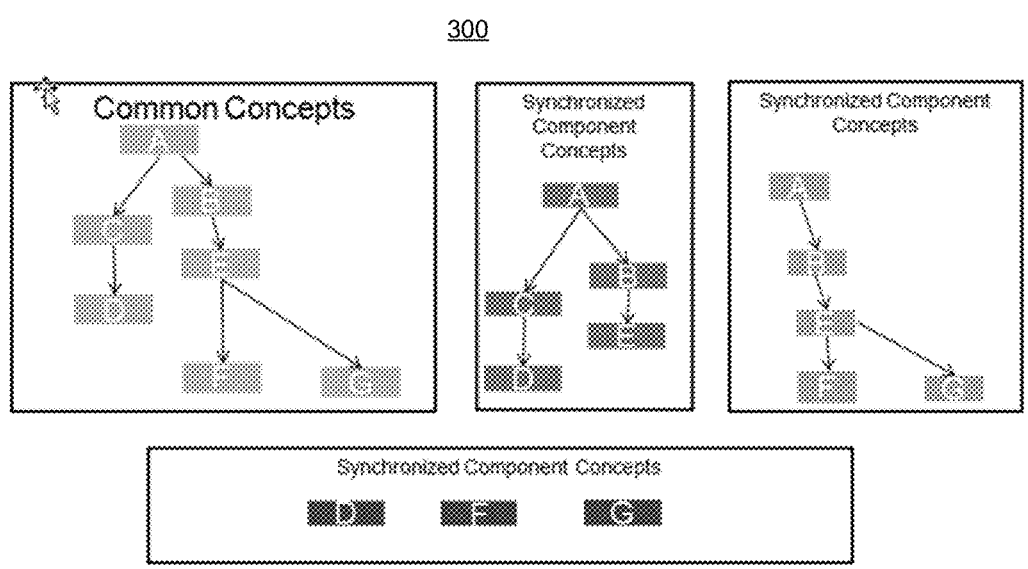
FIG. 3B is a block diagram illustrating a common model and corresponding synchronized component concepts grouped by application, in accordance with an embodiment of the invention.

FIG. 3B is a block diagram 350 illustrating a common model/concept and corresponding synchronized component concepts grouped by application, in accordance with an embodiment of the invention. Changes to the common model can be consistently synchronized across application boundaries to ensure cross application consistency. This allows the system to deal with significant complexity between application models and ensure alignment between the systems.

For example, if the common concept B changes, the change can be automatically synchronized in all components that have a synchronized concept B. If the user decides they do not want automatic synchronization then validation will still be provided that shows concept B has diverged in the various components.

Similarly if a change happens in a component, it can be automatically synchronized to the common concept and then back down to any other components interested in that concept. If the automated synchronization is not desired then the problems with model consistency are identified (and builds and deploys of configuration prevented) until a user either manually initiates a synchronization or manually fixes non-compliant models so that they agree.

Figure 4A:
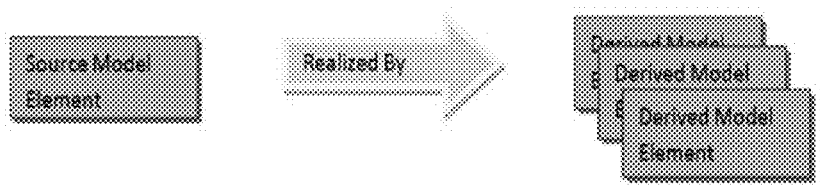
FIG. 4A illustrates a realization of a source model element by multiple derived model elements, in accordance with an embodiment of the invention.

FIG. 4A illustrates realization of a source model element by multiple derived model elements, in accordance with an embodiment of the invention. Simple concepts can require complex configurations spanning multiple systems. Realization enables a user to trace through large complicated models and see what detailed configuration is used to implement seemingly simple concepts.

For example, a realization graphical user interface ("GUI") such as, for example, Oracle Communications Design Studio, can model concepts as abstract or high level model elements (or source models) (e.g., the common concepts discussed above with respect to FIGS. 1-3). Realization allows a user to work with these source models without being concerned with how they will eventually be made real as detailed configuration in various systems. Realization also enables a user to visualize the relationship between the source concepts and the more detailed derived models.

In some embodiments, system 10 comprises a realization framework that is an open framework, and the complexity of the realization, the number of systems involved, and how such systems are integrated can be extended after market. Whenever a concept has a clear implementation pattern, existing functionality (such as, for example, Design Studio's Design Patterns) can be used to augment the derived model and other artifacts that will be generated to make a source concept into real system configuration. It is important to note that the configuration that is generated by the realization GUI can extend to various systems regardless of the particular vendor of the system. In a complicated solution environment, there may be several systems that are desired to work together in complicated ways to realize a seemingly simple concept. The realization of a source concept can include not only the configuration for individual systems, but for the integration that sits between them.

In some embodiments, a special relationship is added between the original source concepts and the derived configuration produced. The potentially higher-level or more comprehensive source concepts, coupled with the ability to produce detailed pattern based configuration, and the special relationship between the source and the derived models allow system 10 (e.g., model manager 18) shown in FIG. 1 to efficiently manage the life cycle of the source concepts and the implementation behind them.

Figure 4B:
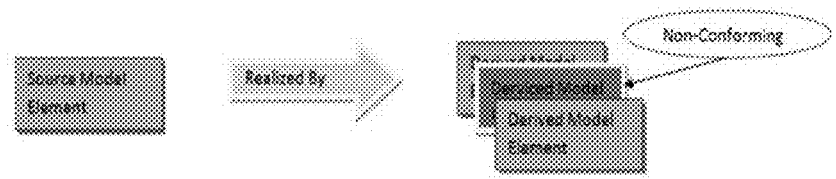
FIG. 4B illustrates a validation of the realization of a source model by multiple derived model elements, in accordance with an embodiment of the invention.

FIG. 4B illustrates validation of the realization of a source model by multiple derived model elements, in accordance with an embodiment of the invention. Validation is a key feature in ensuring the coherence between the original model and the realization model within a solution. The original concept, in addition to its other roles, also acts as a high level blueprint of the system under development. The realization relationships that are tracked allow for integration of the derived models involved in the realization, ensures that certain conditions are met, that certain configuration exists, are configured correctly, and conform to the intent of the source concepts.

Source concepts may go through a development life-cycle where ideas are constantly refined and elaborated. Through this lifecycle the realization of concepts can be traced to identify places where the source models no longer align with the realization models and inform the modeler and/or automatically re-align the models. The modeler knows when and where the derived model has diverged from the intent of the source model. Secondly, since the realization can span multiple systems, validation can be used to ensure that a single concept has a consistent derived model in multiple systems.

Figure 4C:
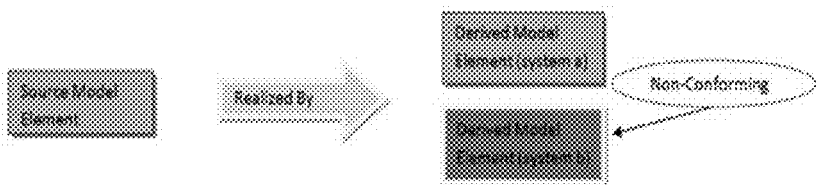
FIG. 4C illustrates a validation of the realization of a source model element by derived model elements spanning multiple systems, in accordance with an embodiment of the invention.

FIG. 4C illustrates validation of the realization of a source model element by derived model elements spanning multiple systems, in accordance with an embodiment of the invention. The configuration for each of the systems involved can be very different, yet the validation can flag places where there are incompatibilities. Sometimes this will result in problems being reported in the source level model if there is no way to represent the concept consistently across applications, which can, for example, trigger changes to the source concept.

Figure 5:
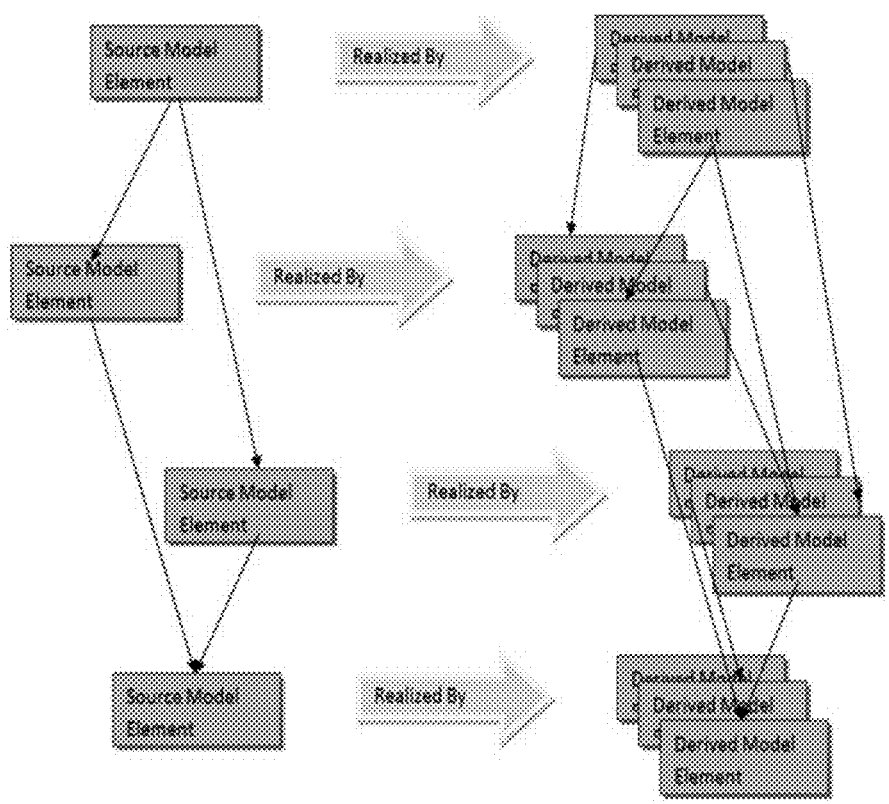
FIG. 5 illustrates a realization of a source model comprising multiple source model elements by a derived model comprising multiple derived model elements, in accordance with an embodiment of the invention.

FIG. 5 illustrates realization of a source model comprising multiple source model elements by a derived model comprising multiple derived model elements, in accordance with an embodiment of the invention. The source models involved in even a small solution can contain hundreds or even thousands of model elements, and these model elements can have complex interactions with each other. Validation can also ensure that the interactions and relationships between the realization models conform to what is in the overall source model. Manually ensuring that this type of cohesion is enforced within a single solution is difficult. Across multiple systems in complicated solutions it is exceptionally difficult and currently accounts for major amounts of investment in the development of large solutions.

Designing a solution can be an iterative process, and a high level model may go through many changes over its life; each iteration representing a more complete understanding of the solution model. As the model changes, validation will tell a modeler when and where the derived model no longer conforms to the intent of the source model. Synchronization re-aligns the portions of the detailed model that no longer conform. The user can request that a specific potion of the model be re-aligned or that an entire model be synchronized.

Synchronization can be performed by applying automated templates (such as, for example, design patterns) to nodes within the model. The templates that are applied to each node can be individually selected by the modeler and can represent common modeling solutions that can be applied to generate derived models and other configuration.

It is also possible that detailed application configurations exist before a source model. In these cases a source model can be generated from the detailed model with the appropriate realization linkage (i.e., reverse model generation). This allows the detailed model to be evolved and validated through the use of the source model and integrated into a larger more complex solution.

Figure 6:
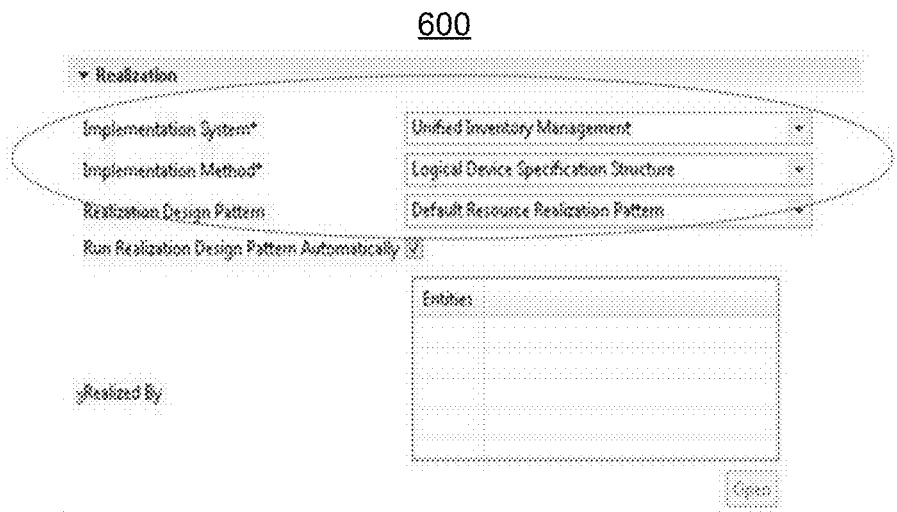
FIG. 6 illustrates a graphical user interface ("GUI") for realization configuration, in accordance with an embodiment of the invention.

FIG. 6 illustrates a graphical user interface ("GUI") 600 for realization configuration, in accordance with an embodiment of the invention. Any model element that supports realization can be configured to specify the type of realization desired. GUI 600 includes user input fields for configuring realization settings including: a field for Implementation System, a field for Implementation Method, and a field for Realization Design Pattern.

The Implementation System determines which solution system will realize the source model element. The Implementation Method describes which of the specific model elements for that system will be used to "back" the source concept. The Realization Design Pattern determines how the realization model will be specifically configured and what supporting model elements or technical artifacts will also need to be generated or configured.

Figure 7:
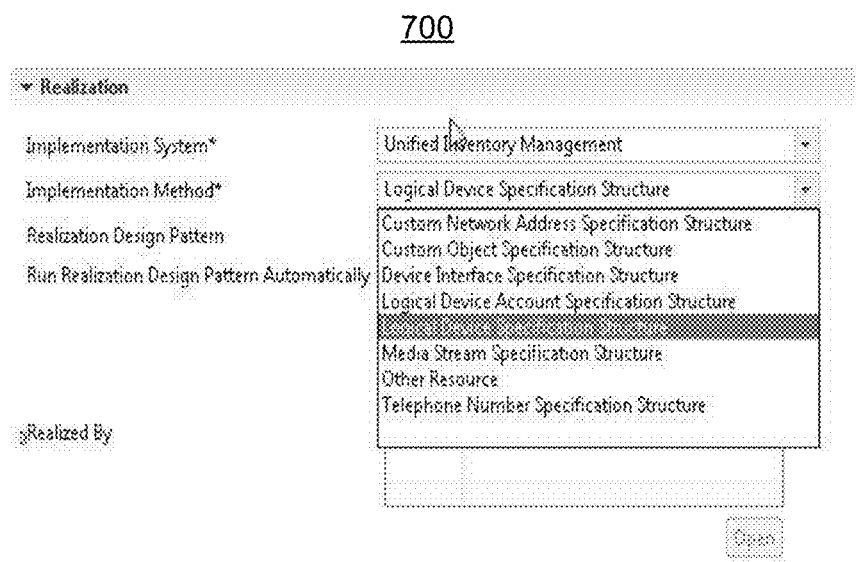
FIG. 7 illustrates a realization GUI including extensible configuration fields, in accordance with an embodiment of the invention.

FIG. 7 illustrates a realization GUI 700 including extensible configuration fields, in accordance with an embodiment of the invention. GUI 700 includes extensible fields as drop-down boxes for the Implementation System, Implementation Method, and Realization Design Pattern realization configuration options. These drop-down boxes can include options provided out of the box for these three fields, where each option represents how the source concepts/models are realized using one or more corresponding applications such as, for example, enterprise applications. These values are field extensible such that anyone (e.g., consultants, integration partners, system integrators, and end users/customers) can extend the concepts to represent other systems and models and provide different implementation patterns that can be used to produce detailed configuration and/or technical artifacts such as application source code (e.g., Java code), scripts, custom configuration, or any other file-based artifact desired to realize the source concept.

This allows organizations to build up a library of Implementation methods and sets of design patterns for common scenarios they encounter in solution development that can be used to radically accelerate development. Complex concepts can be sketched out quickly in the source model without bogging down in detailed application concepts and then can be quickly realized as derived model elements and other more technical configuration.

Figure 8:
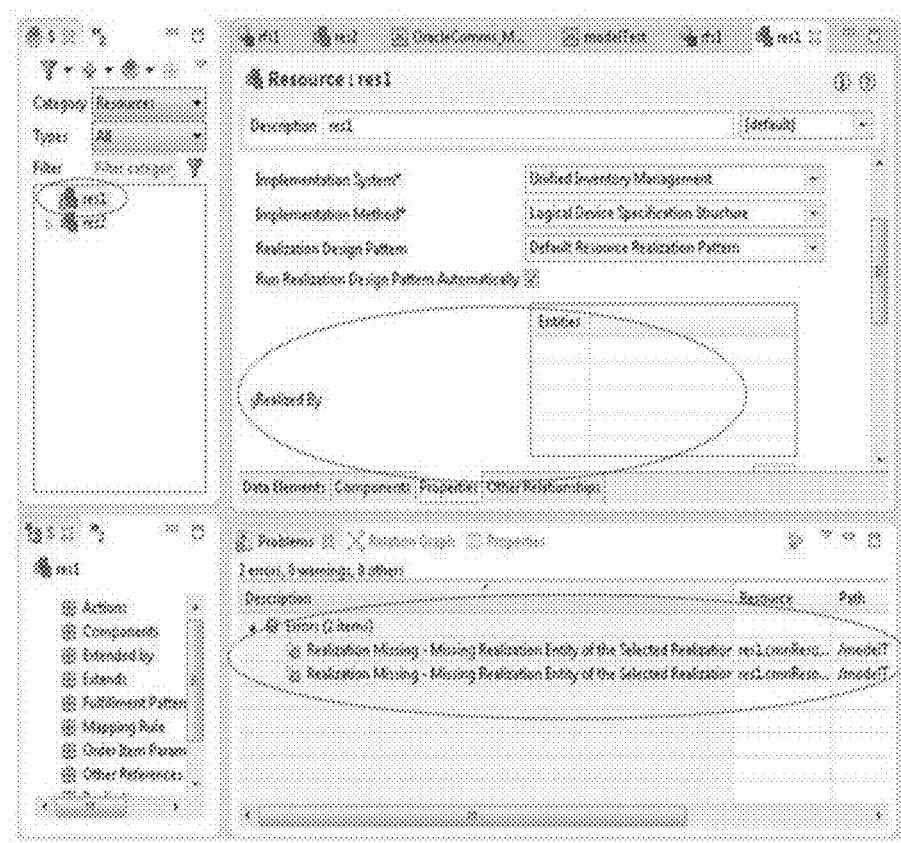
FIG. 8 illustrates a realization GUI for displaying validation errors for missing realization configuration fields, in accordance with an embodiment of the invention.

FIG. 8 illustrates a realization GUI 800 for displaying validation errors for missing realization configuration fields, in accordance with an embodiment of the invention. Once the realization has been configured, the system is able to start validating the intent against the actual derived model and raising problems where the intent is not being satisfied. The system will do this by raising problem markers on various parts of the GUI that draw the user's attention to the fact that the realization criteria have not been met. After the user configures the realization they can also run the realization design pattern specified for the model element.

Figure 9:
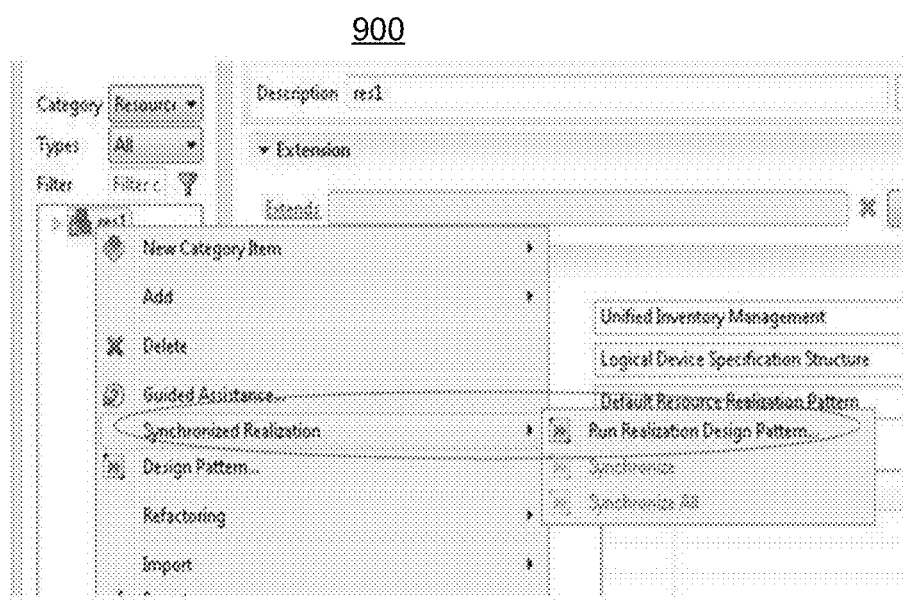
FIG. 9 illustrates a realization GUI for running a realization design pattern, in accordance with an embodiment of the invention.

FIG. 9 illustrates a realization GUI 900 for running a realization design pattern, in accordance with an embodiment of the invention. Design patterns can be used to produce complex configuration. Design patterns are field extensible and can produce any type of file based artifact needed to express a configuration. They also allow for a wizard type user experience so that information can be gathered from the user in an interview phase that will determine the detailed configuration that will be produced. Various places in the GUI can allow the user to initiate the realization design pattern, such as, for example, the "Run Realization Design Pattern . . . " menu item shown in FIG. 9.

Figure 10:
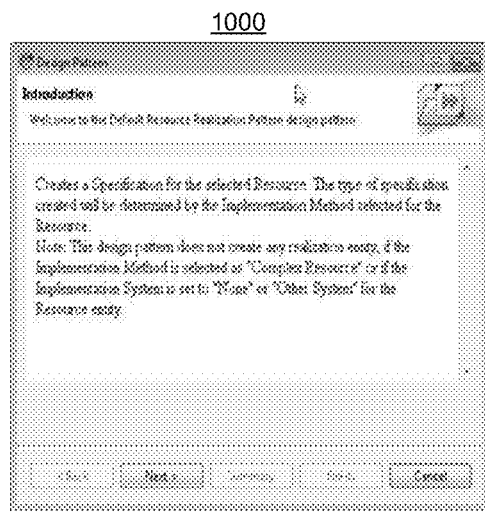
FIG. 10 illustrates a GUI for a realization wizard, in accordance with an embodiment of the invention.

FIG. 10 illustrates a GUI 1000 for a realization wizard, in accordance with an embodiment of the invention. In some embodiments, when the realization design pattern is invoked a specialized wizard is launched that walks the user through the various questions that are needed for the system to know exactly how to realize the source model element. The following FIGS. 10-12 show a simple design pattern that desires a minimal amount of information in order to execute.

Figure 11:
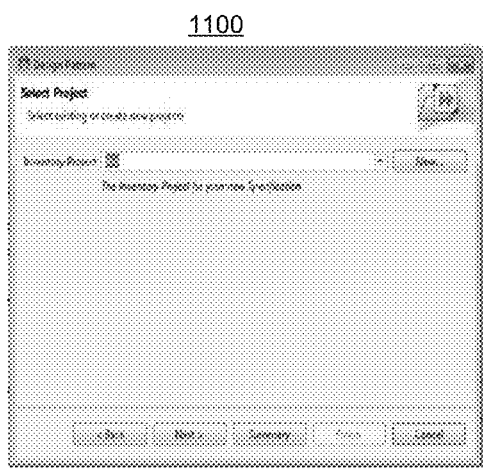
FIG. 11 illustrates a wizard GUI for displaying a resource realization design pattern project selection page, in accordance with an embodiment of the invention.

FIG. 11 illustrates a wizard GUI 1100 for displaying a resource realization design pattern project selection page, in accordance with an embodiment of the invention. GUI 1100 prompts the user to select a project.

Figure 12:
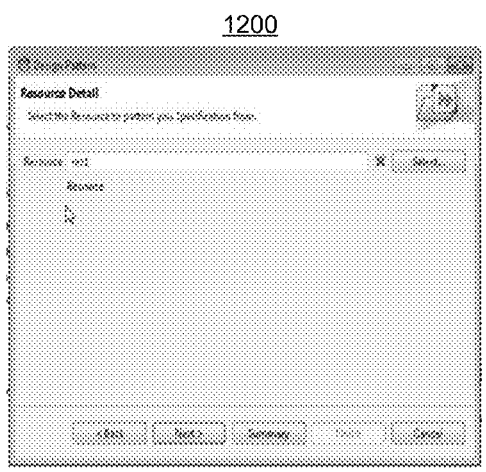
FIG. 12 illustrates a wizard GUI for displaying a resource realization design pattern resource selection page, in accordance with an embodiment of the invention.

FIG. 12 illustrates a wizard GUI 1200 for displaying a resource realization design pattern resource selection page, in accordance with an embodiment of the invention. GUI 1200 prompts the user to select a resource.

Figure 13:
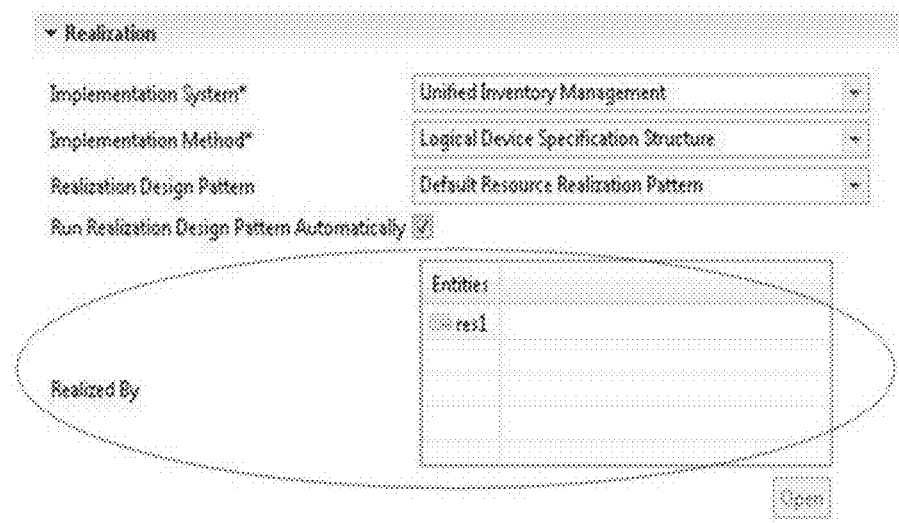
FIG. 13 illustrates a realization GUI displaying a realization relationship in the model element realization configuration area, in accordance with an embodiment of the invention.
Figure 14:
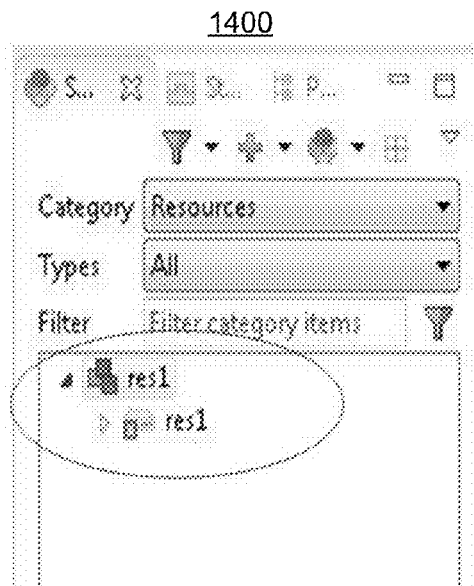
FIG. 14 illustrates a realization GUI displaying a realization relationship showing up in a more visual portion of the user interface, in accordance with an embodiment of the invention.

FIG. 13 illustrates a realization GUI 1300 displaying a realization relationship in the model element realization configuration area, in accordance with an embodiment of the invention. FIG. 14 illustrates a realization GUI 1400 displaying a realization relationship showing up in a more visual portion of the user interface, in accordance with an embodiment of the invention. After the realization design pattern has completed, GUI 1300 is updated to contain the additional derived model and other configuration produced by the pattern, that configuration is also now associated with the source portion of model as its realization. This allows validation to traverse the realization relationship and ensure that the intent of the sketch which was provided is now being faithfully represented in the derived model. GUI 1400 can also be updated to contain the additional derived model.

In embodiments, a wide range of information is captured in the sketch that can be tested in the realization model: Data Interfaces and detailed data structural models, roles and relationships within a larger complex model, component relationships and hierarchies. The realization relationship can be traversed to test and validate that the various aspects of the model are being faithfully represented. The source model becomes a contract that can be tested and policed in the derived application specific models as they continue to evolve. Where deviations are encountered problem markers can be raised that should be fixed before the application components can be deployed to a solution. The realization relationship can also be used to help visualize how the source model is related to the detailed implementation model.

Figure 15:
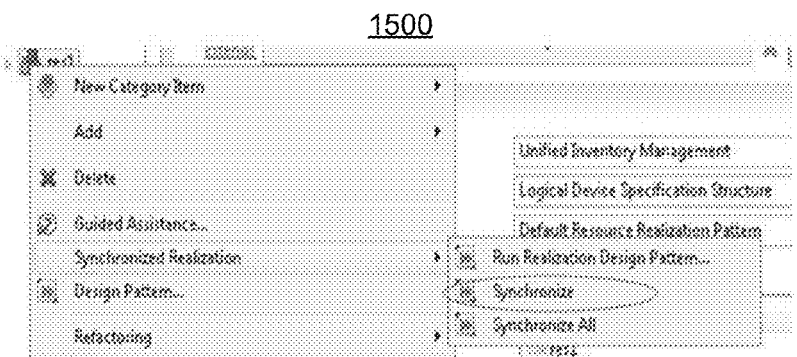
FIG. 15 illustrates a realization GUI having a synchronize command, in accordance with an embodiment of the invention.

In some embodiments, when a realization design pattern is run, the information supplied by the user is saved in a synchronization record. The synchronization record can hold the responses that the modeler gave during the interview phase of the design pattern execution (e.g., the wizard GUIs shown in FIGS. 10-12 above). If the user wants to change any of the answers that they had given earlier they can choose to manually re-run the realization design pattern and make changes as needed FIG. 15 illustrates a realization GUI 1500 having a synchronize command, in accordance with an embodiment of the invention. The user also has the option of re-running the design pattern with the last set of information provided to the design pattern. This bypasses the wizard portion of the flow and runs the realization design pattern with the previously saved values; which is referred to as synchronization. Synchronizations can be initiated in the user interface in various places such as the synchronize command menu item shown in GUI 1500; however it is only enabled when synchronization records from earlier executions are available.

Figure 16:
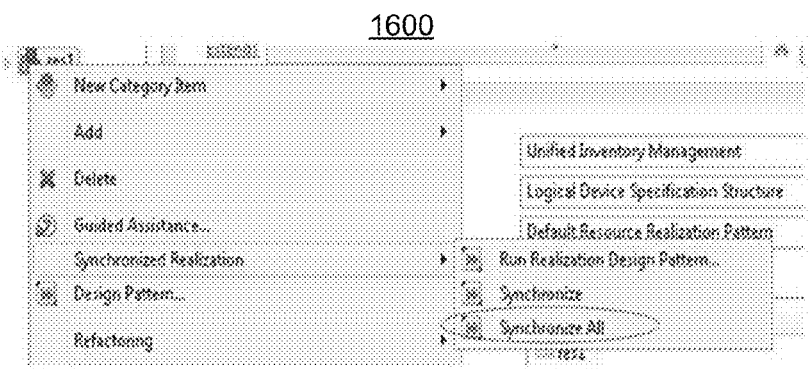
FIG. 16 illustrates a realization GUI having a synchronize all command, in accordance with an embodiment of the invention.
Figure 17:
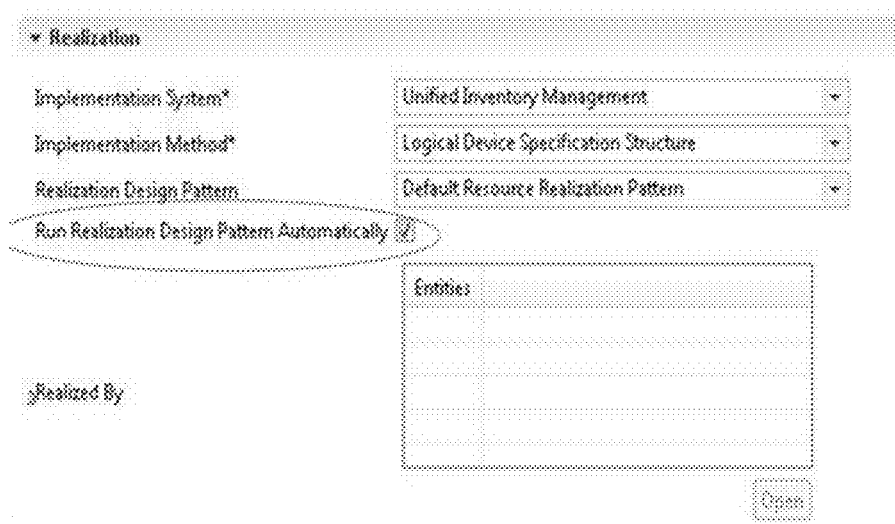
FIG. 17 illustrates a realization GUI having a run realization design pattern automatically configuration option selected, in accordance with an embodiment of the invention.

FIG. 16 illustrates a realization GUI 1600 having a synchronize all command, in accordance with an embodiment of the invention. FIG. 17 illustrates a realization GUI having a run realization design pattern automatically configuration option selected, in accordance with an embodiment of the invention. Solution models can be large and complicated, and synchronizing nodes within a solution model individually can be very repetitive and tedious if there have been substantial changes. There are two features that help streamline the process in some embodiments. The first is the "synchronize all" command shown in GUI 1600. If the "synchronize all" command is initiated, then the relationships between nodes within the solution model are traversed and all nodes that have a synchronization record will be synchronized. This allows the realization design patterns for a large number of related model elements to be re-run in a single user operation.

The second feature that helps streamline the process is that when the realization configuration is set for a model element, the realization design pattern can be set to run automatically by selecting the "run realization design pattern automatically" configuration option shown in GUI 1700. This means that once a synchronization record exists for a node, the realization design pattern will be run whenever a change is made to that node or any closely related node within the solution hierarchy. While working in this mode the detailed realization model is kept in sync with the evolving solution model in the background without the need for explicit user initiated actions.

Figure 18:
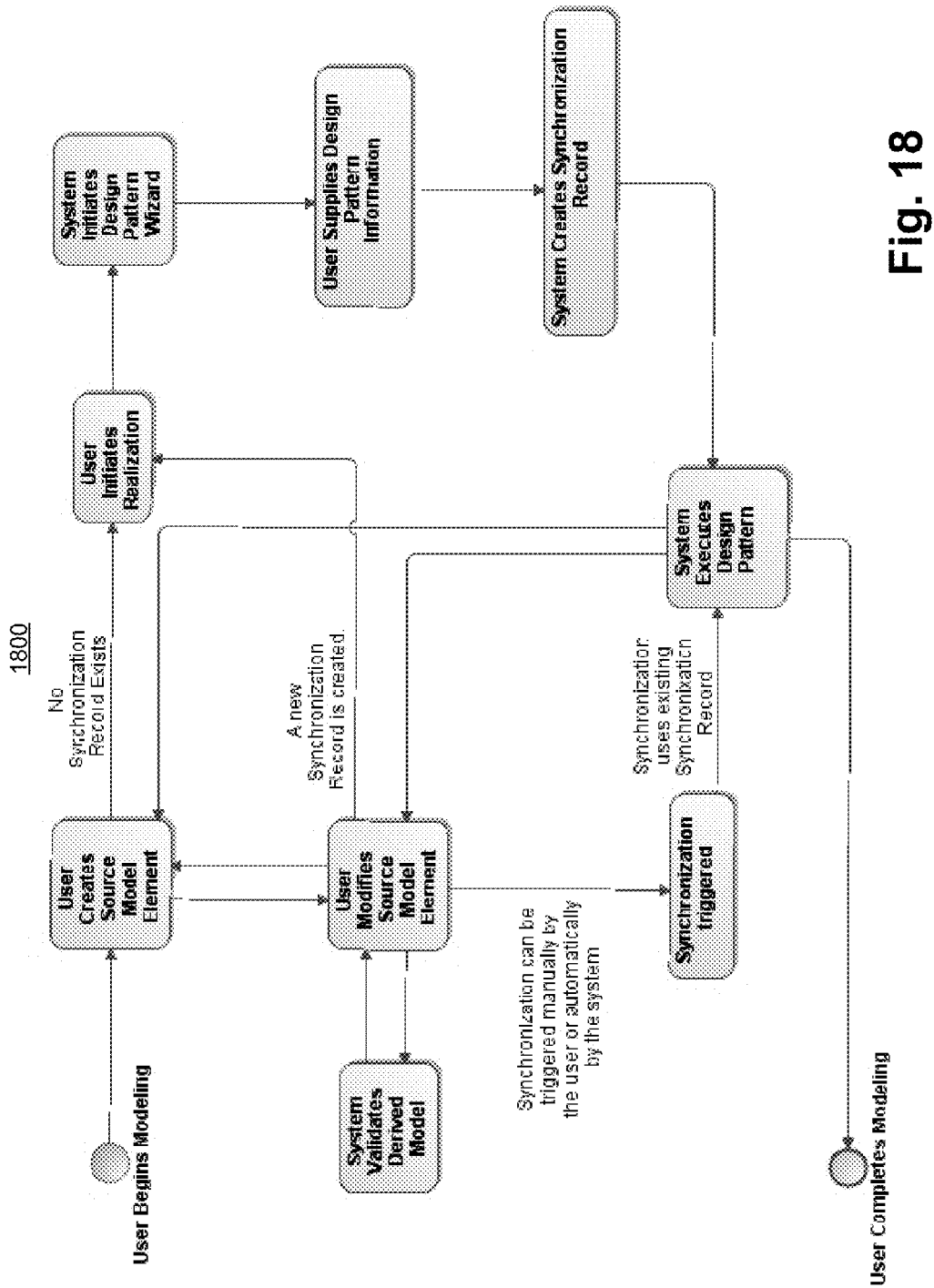
FIG. 18 illustrates a flow diagram of the functionality of realization modeling, in accordance with an embodiment of the invention.
Figure 19:
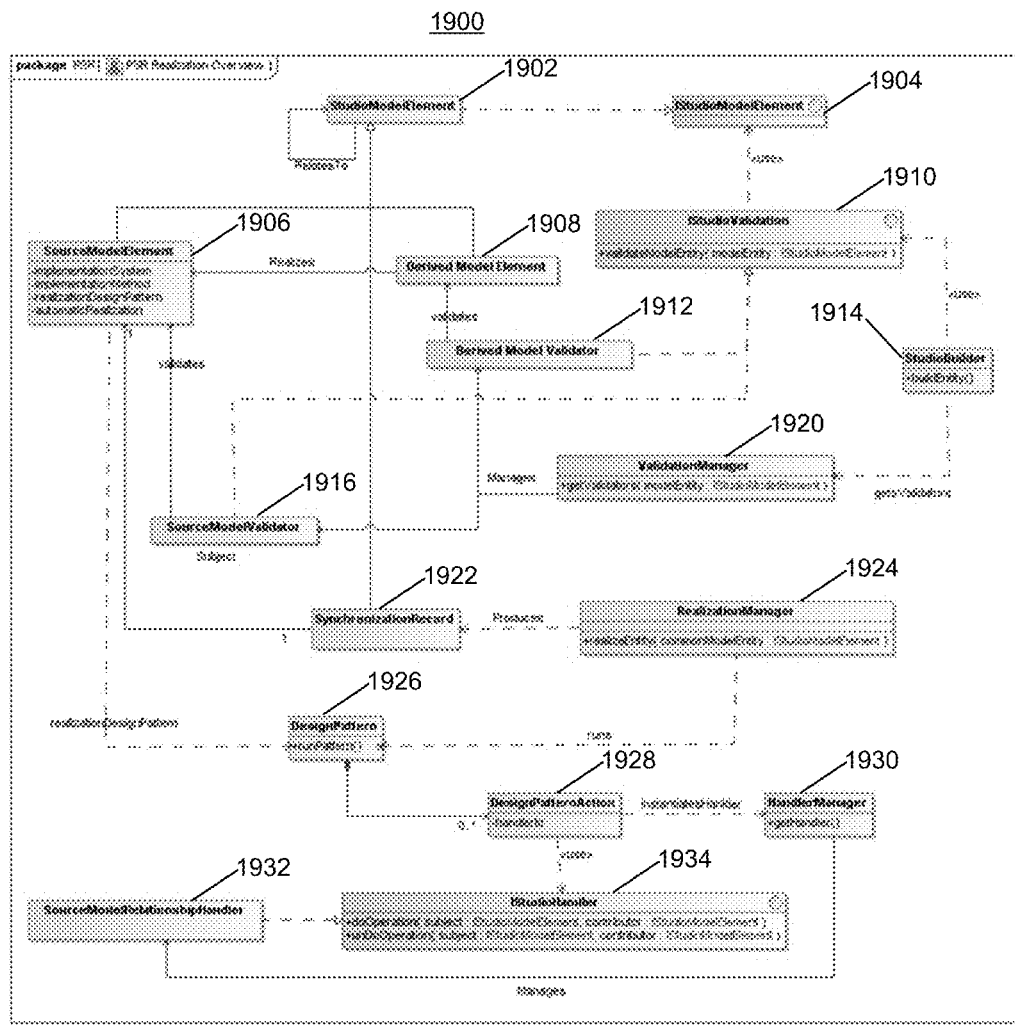
FIG. 19 illustrates a domain model of a realization framework, in accordance with an embodiment of the invention.

FIG. 18 illustrates a flow diagram 1800 of the functionality of realization modeling, in accordance with an embodiment of the invention. In one embodiment, the functionality of the flow diagram of FIG. 18, and the functionality of the flow/sequence diagrams of FIGS. 20-22 and the domain model of FIG. 19 are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

Flow diagram 1800 shows the modeling flow of a user creating a source model. Certain tasks within flow 1800 are iterative and/or repetitive. For example, the user can perform the "User Creates Source Model Element" task many times. Similarly, the user can modify source model elements as the overall model matures. The user may choose to create a model element, realize it, modify it, synchronize it, and continue to make changes and synchronize as they go. This style of working will keep the derived model in sync with the source model as the user progresses.

The user can also choose to go long periods of time working in the source model without synchronizing the derived model. In this case, as the model evolves validation is performed and the user is provided with feedback that allows them to see where the derived model has diverged from the source model and where no realization yet exists.

FIG. 19 illustrates a domain model 1900 of a realization framework, in accordance with an embodiment of the invention. The realization framework is configured to outline a pattern and model 1900 describes how the framework uses that pattern, but may not give a complete picture of the modeling experience of a user. Model 1900 is based on Oracle's Design Studio model which has been adapted to support the realization framework as described below. The terms "SourceModelElement" 1906 and "DerivedModelElement" 1908 are not modeling concepts that a user would directly use to express a concept. Instead they are extended to provide model elements that give a user a more concrete language to model solution concepts. For example, Products, Services, Resources, Locations and Actions are types of SourceModelElements 1906. A user that is sketching out a solution can create instances of Products, Services, etc., to create a model a of specific solution, such as, for example, to describe the model required to sell Digital Subscriber Line ("DSL") Products or some other commercially provided service. Similarly, DerivedModelElements 1908 are extended to represent discreet pieces of application configuration that are needed to provide specific application functionality. The framework described by domain model 1900 can be used to turn the concrete Source Model into something applications can use.

StudioModelElements 1902 deals with common problems such as persistence, user interface bindings as well as infrastructure for features such as relationships and validation that will be specialized by more concrete model entities. IStudioModelElement 1904 is an interface that can be used to generically manipulate any StudioModelElement 1902. For example, the build system does not need to understand what type of StudioModelElement 1902 it is validating; it can work with the Validation Manager using an IStudioModelElement 1904 to retrieve the validators that apply to this type of model element. There are many places in the realization domain model where the inputs to operations are generic IStudioModelElements 1904. Part of the interface provides identifiers that can be used to determine the concrete implementation for a model element. These identifiers are used as extension points that allows decoupled behavior to be created, such as validators or handlers which can be registered against the type identifiers. In this way a subsystem such as the Validation Manager can ask an IStudioModelElement 1904 what type of entity sits behind it and return the registered validators for that type. The concept of the use of registration to support model extension pre-exists the realization framework but is leveraged heavily by it.

SourceModelElement 1906 is a type of StudioModelElement 1902 that supports the realization framework. It is not a concrete class. SourceModelElement 1906 will be further extended by any model element that can be used as a source for realization. For example: Services, Resources, Locations and Products are all concrete StudioModelElements 1902 that extend SourceModelElement 1906 and therefore can be used as the source of a realization. As such there is specific information (such as "implementationSystem," "implementationMethod" and "realizationDesignPattern") that part of the data model of each example that allows it to be used generically manipulated by subsystems such as the Synchronization Manager.

SourceModelElements 1906 also inherit a rich set of functionality from StudioModelElement 1902 that allows the creation of data models, relational models and behavioral models between instances of the concrete types. These capabilities inherited from StudioModelElement 1902 play a role in describing a complex model that can then be realized and validated later.

DerivedModelElement 1908 is used by the Realization framework. The primary difference between a regular StudioModelElement 1906 and a DerivedModelElement 1908 is that the DerivedModelElement 1908 contains a specialized relationship that allows it to track the SourceModelElement 1906 it originates from. This is later used by validators to navigate back and forth between the source and derived models and ensure compliance between the two. Any Concrete StudioModelElement 1902 that can play the role of a DerivedModelElement 1908 will extend from this class.

IStudioValidator 1910 is an existing interface that allows the build subsystem to deal with any validators registered against specific StudioModelElement 1902 types generically. The build system will ask the Validation Manager 1920 for a set of validators that apply to a IStudioModelElement 1904. Validation Manager 1920 returns one or more IStudioValidators. The build system does not need to know anything about what the validators do, it only needs to trigger validation.

A number of SourceModelValidators 1916 have been built that perform specific validation on various parts of the source model as part of the realization framework. They are generally built at the concrete level of the source model and interrogate the derived model to ensure intent is met. Validators are field extensible, so end users are able to add to the validation supplied by oracle as they create design patterns and realization patterns that represent common modeling situations encountered in solution development.

Validation Manager 1920 creates and caches concrete validators as needed and associates them with specific types of StudioModelElements 1902. The manager can be used by other sub systems to return a set of applicable validators for any IStudioModelElement 1904

StudioBuilder 1914 provides a number of services, in the context of the Realization framework the service that is most important is Validation. Depending on the settings in a user's workspace, the build system can either be automatically triggered whenever a change takes place in the workspace or it can be manually triggered by a user. In either case, as part of the build process each StudioModelElement 1902 will be validated using the specific validators registered for that type. If the StudioModelElement 1902 passes validation, then the StudioBuilder 1914 will continue on to other activities like packaging and deploying for the StudioModelElement 1902.

Synchronization Manager (or Realization Manager) 1924 coordinates the activities involved in either realizing or synchronizing a SourceModelElement 1906. For example, when either a Realize or Synchronize command is executed, the request is passed to the Synchronization Manager 1924. It is the Synchronization Manager 1924 that will look at the configuration of the SourceModelElement 1906 and based on that load the appropriate SynchronizationRecord 1922 and DesignPattern 1926 and eventually launch the Realization Design Pattern.

Synchronization Record 1922 is created by the Synchronization Manager 1924 when a Design Pattern 1926 is run interactively. After the Design Pattern Wizard collects user provided information, that information is persisted inside of the Synchronization Record 1922. This enables the Synchronization Manager 1924 to later run the Realization Design Pattern 1926 using the last persisted set of information, skipping the "wizard" part of the flow and allowing the design pattern to run without human intervention.

Design Pattern 1926 provides a user extensible templating language that can be used to generate complex configuration and technical artifacts in Design Studio. It provides a language that allows someone to build a template that can interactively ask the user questions and based on those questions produce specialized artifacts.

Design Pattern Actions 1928 allow a design pattern to do more than lay down templates; once the specialized templates are generated actions can be run as part of the design pattern to perform many of the tasks previously performed manually through the Design Studio user interface. This allows for much more complex configuration to be generated than what was possible in the past.

Design Pattern Actions 1928 are performed by "StudioHandlers," the IStudioHandler 1934 interface allows the design pattern framework to work with the StudioHandlers generically.

The Handler Manager 1930 is responsible for loading, caching and disposing of StudioHandlers as needed. It is used by the design pattern Framework to retrieve concrete handlers so that they can be used to execute Design Pattern Actions 1928 without knowing anything about the specific handler.

SourceModelRelationshipHandlers 1932 are a set of StudioHandlers that were implemented as part of the Realization framework in order to expose a wide range of operations that traditionally could only be performed through the Design Studio user interface.

Figure 20:
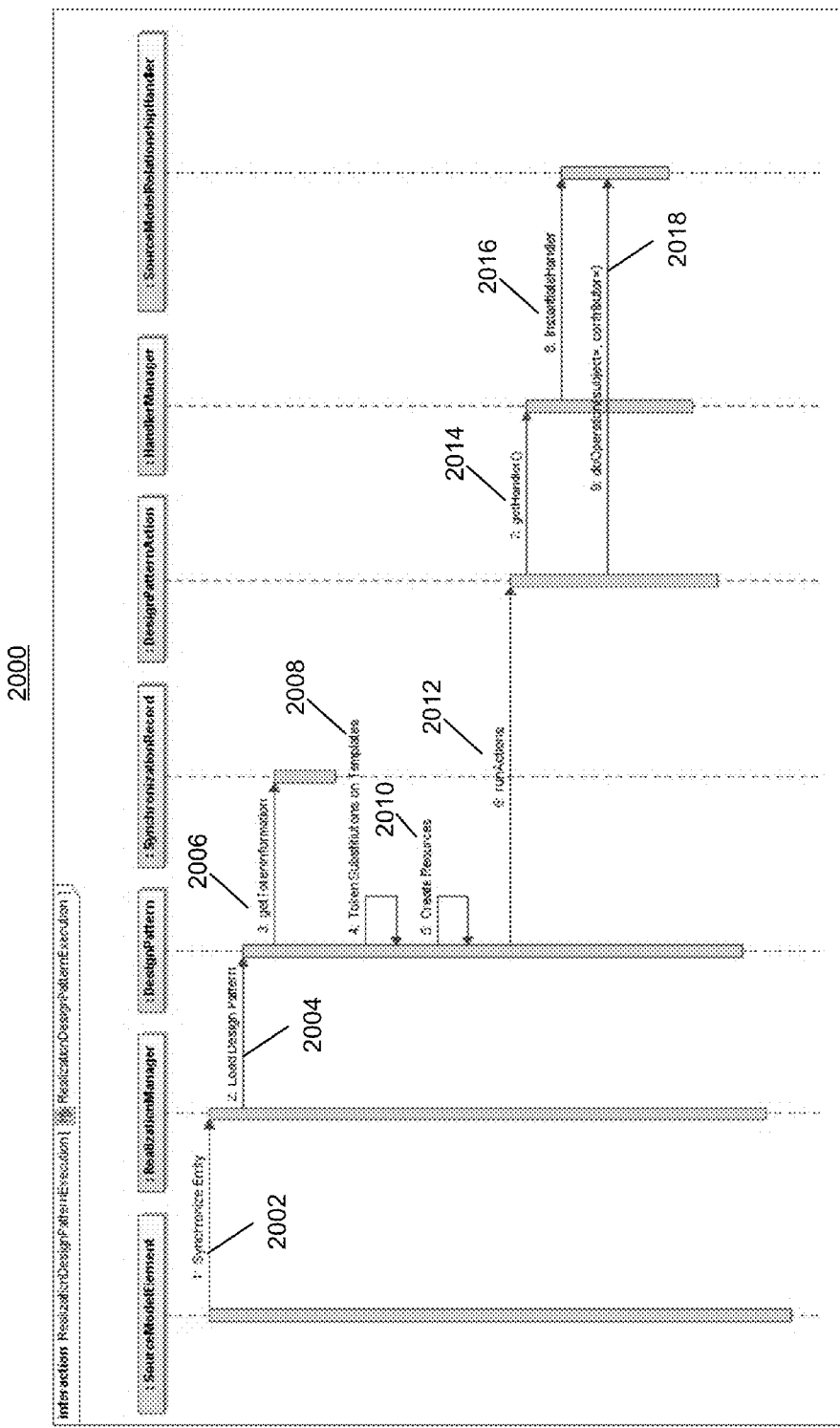
FIG. 20 illustrates a sequence diagram of a synchronization processing model, in accordance with an embodiment of the invention.

FIG. 20 illustrates a sequence diagram 2000 of a synchronization processing model, in accordance with an embodiment of the invention. Sequence diagram 2000 shows how the major sub systems involved in synchronization work together to run a realization design pattern.

At 2002, a user initiates a "synchronize" operation on a Source Model Element.

At 2004, a Realization Manager such as, for example, Realization Manager 1924, receives the request for the operation and loads a Realization Design Pattern corresponding to the selected Source Model Element.

At 2006, once the Design Pattern is loaded, previously captured user input is loaded automatically from a synchronization record into the Design Pattern.

At 2008, user input is inserted it into various templates within the Design Pattern to customize the output that will be generated based on user input.

At 2010, output of the Design Pattern is generated. The output can be in the form of resources (e.g., files) that can, for example, be copied into the user's modeling environment.

At 2012, one or more Actions specified in the Design Pattern are initiated against the output of the Design Pattern generated at 2010 (e.g. Actions specified in the Design Pattern are initiated against resources that have been created inside of the user's modeling environment).

At 2014, for each Action specified in the Design Pattern, the Action requests a handler from a Handler Manager such as, for example, Handler Manager 1930. The handler provided by the Handler Manager can be used to perform operations for the corresponding Action.

At 2016, the Handler Manager instantiates the handler and passes it back to the requesting Action At 2018, the Action performs operations (e.g., performs operations against the output of the Design Pattern generated at 2010) by delegating work to the handler obtained at 2016.

It will be appreciated that 2004-2018 can be performed by a module such as model manager module 18 of FIG. 1.

Figure 21:
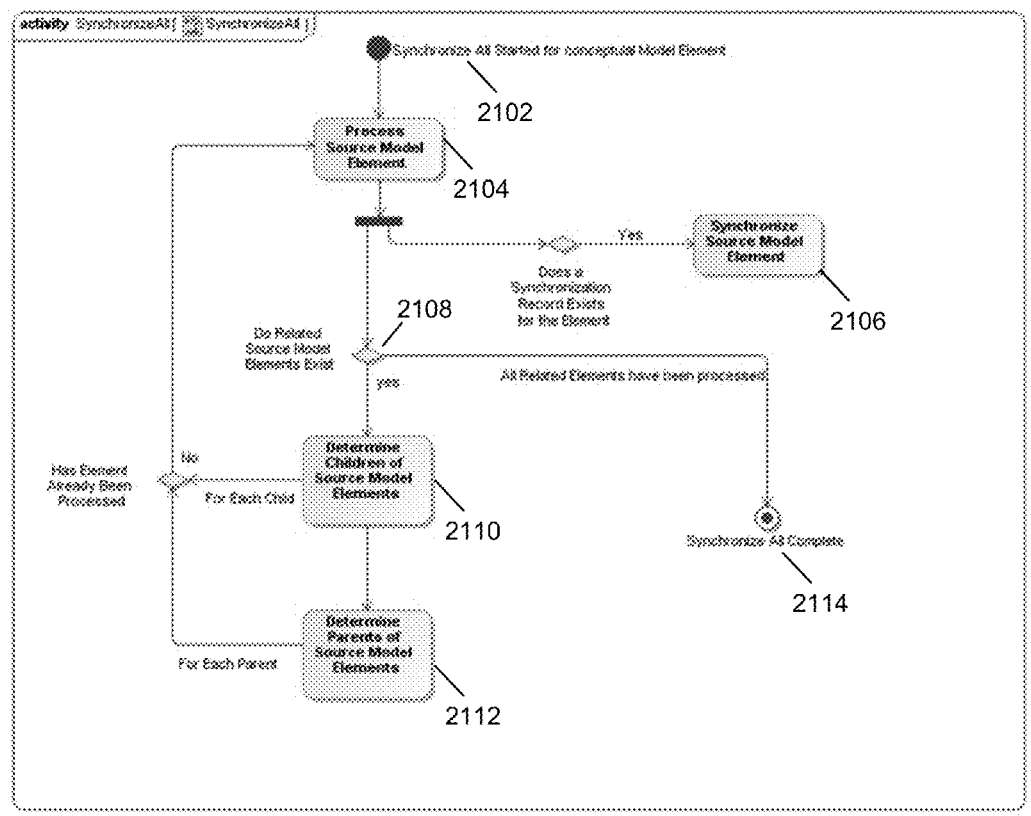
FIG. 21 illustrates a flow diagram of the functionality of synchronizing all activity, in accordance with an embodiment of the invention.

FIG. 21 illustrates a flow diagram 2100 of the functionality of synchronizing all activity, in accordance with an embodiment of the invention. Diagram 2100 shows the flow of logic when performing a "synchronize all" operation.

At 2102, a user initiates a "synchronize all" operation against a selected entity (or "Source Model Element" or "element").

At 2104, module 18 begins processing the entity.

At 2106, if a synchronization record exists for the entity, module 18 runs a design pattern for the entity using information from the synchronization record of the entity. If a synchronization record does not exist, then the design pattern for that entity is not run. Running a design pattern for the entity can include, for example, the operations shown in FIG. 20.

At 2108, module 18 determines whether there are related entities related to the entity processed at 2104. Related entities can include child and parent entities of the entity processed at 2104. For example, StudioModelElements can have relationships with each other. They can be arranged in large hierarchies and individual source model elements can be linked into several nodes. When performing a "synchronize all" operation, the child elements can be the elements that are referenced by the current source model element in a hierarchy. Similarly, the parent source model elements can be the elements that reference the current source model element in a hierarchy.

At 2110, module 18 determines whether there are child entities of the entity processed at 2104. For each child entity, module 18 determines whether the child was previously processed as part of this "synchronize all" operation and, if it has not been processed, then module 18 returns to 2104 to process the child entity.

At 2112, after all child entities are processed, module 18 then determines whether there are parent entities of the entity processed at 2104. For each parent entity, module 18 determines whether the parent was previously processed as part of this "synchronize all" operation and, if it has not been processed, then module 18 returns to 2104 to process the parent entity.

At 2114, module 18 completes processing the "synchronize all" operation when all related entities of the entity that the "synchronize all" operation was issued against have been processed.

Figure 22:
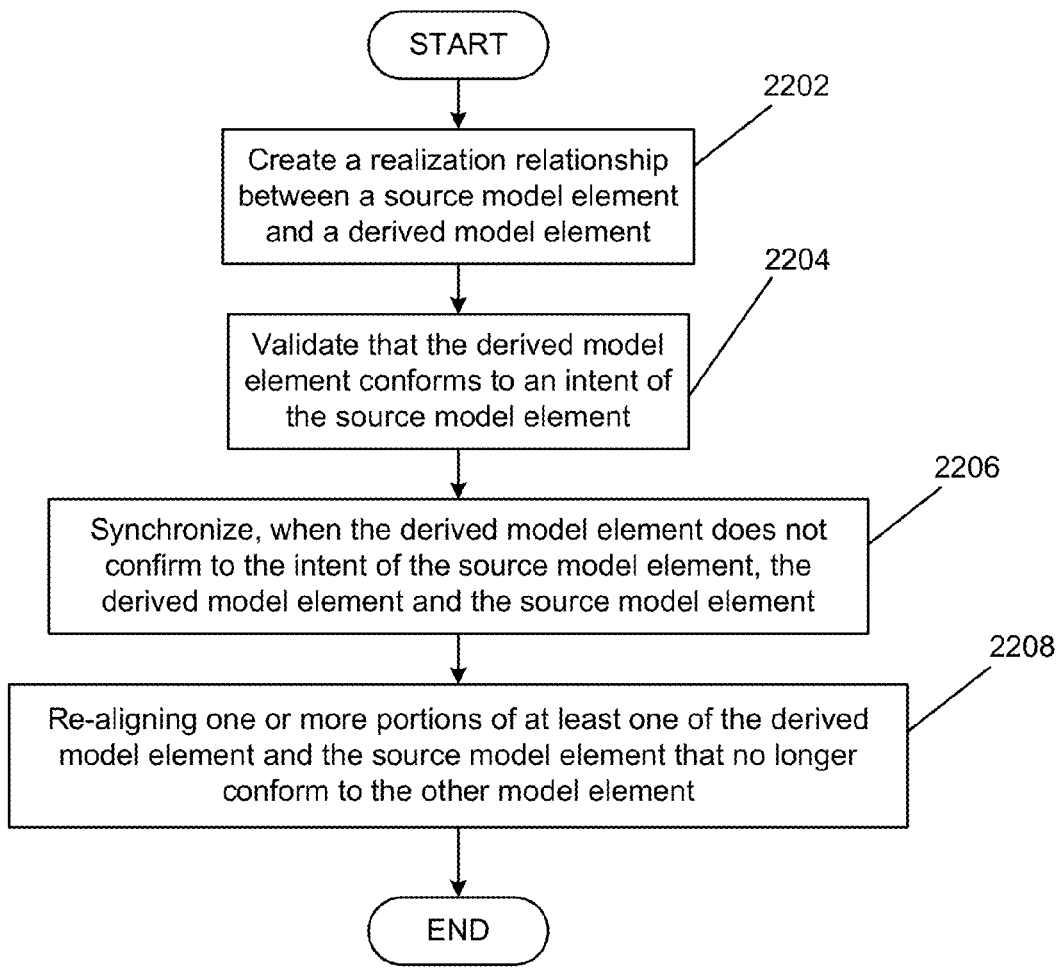
FIG. 22 illustrates a flow diagram of the functionality of model derivation and alignment, in accordance with an embodiment of the invention.

FIG. 22 illustrates a flow diagram of the functionality of model derivation and alignment, in accordance with an embodiment of the invention.

At 2202, module 18 creates a realization relationship between a source model element and a derived model element.

At 2204, module 18 validates that the derived model element conforms to an intent of the source model element.

At 2202, module 18 synchronizes, when the derived model element does not confirm to the intent of the source model element, the derived model element and the source model element.

At 2202, module 18 re-aligns one or more portions of at least one of the derived model element and the source model element that no longer conform to the other model element.

In some embodiments, module 18 can realize the source model element by the derived model element, the realizing including generating the derived model element based on the source model element and design pattern information.

In some embodiments, module 18 can generate the source model element based on the derived model element with a realization linkage between the generated source model element and the derived model element.

In some embodiments, the synchronizing includes prompting a user for input and module 18 performs the re-aligning responsive to the user's input. In some embodiments, the synchronizing is performed automatically. In some embodiments, the synchronizing includes re-aligning a portion of the derived model element that no longer conforms to the source model element. In some embodiments, the synchronizing includes re-aligning a portion of the source model element that no longer conforms to the derived model element.

In some embodiments, the derived model element is one of a plurality of derived model elements distributed among a plurality of applications, each of the derived model elements being linked in a realization relationship to the source model element. In some such embodiments, when a change is made to the source model element, the synchronizing includes synchronizing the change consistently across application boundaries to ensure cross application consistency.

In some embodiments, module 18 detects a change in at least one of the source model element and the derived model element, and performs the validating responsive to the detecting.

In some embodiments, module 18 deploys the derived model element to a corresponding application, the derived model element configuring the application to implement a product being offered for sale. In some such embodiments, a source model comprises the source model element, the source model defining relationships between the product being offered for sale and services corresponding to the product, and resources that implement the services of the product. In some such embodiments, the product is a telecommunications product and the application being configured is one of an inventory system, an activation system, or an order and service management system. In some such embodiments, module 18 re-deploys, responsive to the synchronizing, the re-aligned derived model element to the application when the derived model element is re-aligned, the derived model element updating the configuration of the application based on a change to the source model element.

As disclosed, embodiments comprise a system that can use a designated model as input to automatically derive solution design artifacts based on model derivation rules (e.g., design patterns). Existing solution design artifacts can be automatically realigned with the model using the same patterns configured to override and correct discrepancies. The system can also be configured to detect changes in the designated model and to automatically propagate the relevant changes to the derived models and design artifacts which may be distributed across application boundaries.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to manage model derivation and alignment, the managing comprising:
    creating a conceptual model including a relationship between a product, corresponding services, and resources needed to implement the services of the product, the conceptual model including common concepts found in a plurality of application models that provide the services;
    creating a realization relationship between a source model element in the conceptual model and a derived model element in an application model of the plurality of application models, the source model element and the derived model element being a common concept;
    validating that the derived model element in the application model conforms to an intent of the source model element in the conceptual model; and
    automatically synchronizing, when the derived model element does not conform to the intent of the source model element, the derived model element and the source model element;
    re-aligning one or more portions of at least one of the derived model element and the source model element that no longer conform to each other; and
    ensuring the derived model element in a second application model of the plurality of application models is aligned to the source model element and the derived model element in the application model for cross-application consistency.

2. The computer readable medium of claim 1, the managing further comprising:
realizing the source model element by the derived model element,
the realizing including generating the derived model element based on the source model element and design pattern information.

3. The computer readable medium of claim 1, the managing further comprising:
generating the source model element based on the derived model element with a realization linkage between the generated source model element and the derived model element.

4. The computer readable medium of claim 1, wherein the synchronizing includes prompting a user for input and the re-aligning is responsive to the user's input.

5. The computer readable medium of claim 1,
wherein the derived model element is one of a plurality of derived model elements distributed among a plurality of applications, each of the derived model elements being linked in a realization relationship to the source model element, and
wherein, when a change is made to the source model element, the synchronizing includes synchronizing the change consistently across application boundaries to ensure cross application consistency.

6. The computer readable medium of claim 5, the managing further comprising:
detecting a change in at least one of the source model element and the derived model element,
wherein the validating is responsive to the detecting.

7. The computer readable medium of claim 1, the managing further comprising:
deploying the derived model element to a corresponding application, the derived model element configuring the application to implement a product being offered for sale,
wherein a source model comprises the source model element, the source model defining relationships between the product being offered for sale and services corresponding to the product, and resources that implement the services of the product.

8. The computer readable medium of claim 7, wherein the product is a telecommunications product and the application being configured is one of an inventory system, an activation system, or an order and service management system.

9. The computer readable medium of claim 8, the managing further comprising:
re-deploying, responsive to the synchronizing, when the derived model element is re-aligned, the re-aligned derived model element to the application, the derived model element updating the configuration of the application based on a change to the source model element.

10. A computer-implemented method for managing model derivation and alignment, the computer-implemented method comprising:
creating a conceptual model including a relationship between a product, corresponding services, and resources needed to implement the services of the product, the conceptual model including common concepts found in a plurality of application models that provide the services;
creating a realization relationship between a source model element in the conceptual model and a derived model element in an application model of the plurality of application models, the source model element and the derived model element being a common concept;
validating that the derived model element in the application model conforms to an intent of the source model element in the conceptual model; and
automatically synchronizing, when the derived model element does not conform to the intent of the source model element, the derived model element and the source model element;
re-aligning one or more portions of at least one of the derived model element and the source model element that no longer conform to each other; and
ensuring the derived model element in a second application model of the plurality of application models is aligned to the source model element and the derived model element in the application model for cross-application consistency.

11. The computer-implemented method of claim 1, the managing further comprising at least one of:
realizing the source model element by the derived model element, the realizing including generating the derived model element based on the source model element and design pattern information; or
generating the source model element based on the derived model element with a realization linkage between the generated source model element and the derived model element.

12. The computer-implemented method of claim 10, wherein the synchronizing includes:
prompting a user for input and the re-aligning is responsive to the user's input.

13. The computer-implemented method of claim 10, the managing further comprising:
detecting a change in at least one of the source model element and the derived model element,
wherein the derived model element is one of a plurality of derived model elements distributed among a plurality of applications, each of the derived model elements being linked in a realization relationship to the source model element,
wherein, when a change is made to the source model element, the synchronizing includes synchronizing the change consistently across application boundaries to ensure cross application consistency, and
wherein the validating is responsive to the detecting.

14. The computer-implemented method of claim 10, the managing further comprising:
deploying the derived model element to a corresponding application, the derived model element configuring the application to implement a product being offered for sale; and
re-deploying, responsive to the synchronizing, when the derived model element is re-aligned, the re-aligned derived model element to the application, the derived model element updating the configuration of the application based on a change to the source model element,
wherein a source model comprises the source model element, the source model defining relationships between the product being offered for sale and services corresponding to the product, and resources that implement the services of the product, and
wherein the product is a telecommunications product and the application being configured is one of an inventory system, an activation system, or an order and service management system.

15. A system comprising:
a memory device configured to store model management module;
a processing device in communication with the memory device, the processing device configured to execute the model management module stored in the memory device to manage model derivation and alignment, the managing comprising:
creating a conceptual model including a relationship between a product, corresponding services, and resources needed to implement the services of the product, the conceptual model including common concepts found in a plurality of application models that provide the services;
creating a realization relationship between a source model element in the conceptual model and a derived model element in an application model of the plurality of application models, the source model element and the derived model element being a common concept;
validating that the derived model element in the application model conforms to an intent of the source model element in the conceptual model; and
automatically synchronizing, when the derived model element does not conform to the intent of the source model element, the derived model element and the source model element;
re-aligning one or more portions of at least one of the derived model element and the source model element that no longer conform to each other; and
ensuring the derived model element in a second application model of the plurality of application models is aligned to the source model element and the derived model element in the application model for cross-application consistency.

16. The system of claim 15, the managing further comprising at least one of:
realizing the source model element by the derived model element, the realizing including generating the derived model element based on the source model element and design pattern information; or
generating the source model element based on the derived model element with a realization linkage between the generated source model element and the derived model element.

17. The system of claim 15, wherein the synchronizing includes:
prompting a user for input and the re-aligning is responsive to the user's input.

18. The system of claim 15, the managing further comprising:
detecting a change in at least one of the source model element and the derived model element,
wherein the derived model element is one of a plurality of derived model elements distributed among a plurality of applications, each of the derived model elements being linked in a realization relationship to the source model element,
wherein, when a change is made to the source model element, the synchronizing includes synchronizing the change consistently across application boundaries to ensure cross application consistency, and
wherein the validating is responsive to the detecting.

19. The system of claim 15, the managing further comprising:
deploying the derived model element to a corresponding application, the derived model element configuring the application to implement a product being offered for sale; and
re-deploying, responsive to the synchronizing and when the derived model element is re-aligned, the re-aligned derived model element to the application, the derived model element updating the configuration of the application based on a change to the source model element,
wherein a source model comprises the source model element, the source model defining relationships between the product being offered for sale and services corresponding to the product, and resources that implement the services of the product, and
wherein the product is a telecommunications product and the application being configured is one of an inventory system, an activation system, or an order and service management system.

* * * * *